US007493262B2

(12) United States Patent
Hagelin

(10) Patent No.: US 7,493,262 B2
(45) Date of Patent: *Feb. 17, 2009

(54) METHOD FOR VALUING INTELLECTUAL PROPERTY

(75) Inventor: Theodore Hagelin, Manlius, NY (US)

(73) Assignee: Syracuse University, Syracuse, NY (US)

( * ) Notice: Subject to any disclaimer, the term of this patent is extended or adjusted under 35 U.S.C. 154(b) by 794 days.

This patent is subject to a terminal disclaimer.

(21) Appl. No.: 11/026,489

(22) Filed: Dec. 30, 2004

(65) Prior Publication Data

US 2005/0149420 A1 Jul. 7, 2005

Related U.S. Application Data

(63) Continuation-in-part of application No. 09/726,277, filed on Nov. 30, 2000, now Pat. No. 7,188,069.

(51) Int. Cl.
G06Q 99/00 (2006.01)
(52) U.S. Cl. ............... 705/1; 705/1; 705/26; 705/27; 705/35; 705/36; 705/37; 707/6; 709/200
(58) Field of Classification Search ............ 705/1, 705/26–27, 35–366; 707/6; 709/200
See application file for complete search history.

(56) References Cited

U.S. PATENT DOCUMENTS 6,321,205 B1 * 11/2001 Eder .............................. 705/7
6,556,992 B1 * 4/2003 Barney et al. .................. 707/6
6,615,195 B1 * 9/2003 Chittipeddi ................ 705/400
7,272,572 B1 * 9/2007 Pienkos ...................... 705/26
2002/0002523 A1 * 1/2002 Kossovsky et al. ......... 705/36

(Continued)

FOREIGN PATENT DOCUMENTS

CA 2201429 A * 10/1998

(Continued)

OTHER PUBLICATIONS

Bertolotti et al. "WIPO National Seminar on the Valuation of Industrial Property Assets", Nov. 26-27, 1996; 13 pgs.*

(Continued)

Primary Examiner—John W. Hayes
Assistant Examiner—Freda A Nelson
(74) Attorney, Agent, or Firm—George R. McGuire; David L. Nocilly; Bond Schoeneck & King, PLLC

(57) ABSTRACT

A computer based system and method for calculating the value of a license for an intellectual property asset between a licensor and a licensee based on the licensor and licensee investment in the license, as well as the predicted increase in product value due to the change in competitive advantage afforded by the intellectual property asset that is the subject of the license. The value of the license may be discounted to adjust for various risks or adjusted based on whether the license is exclusive, limited exclusive, or non-exclusive. The system and method calculates an equal return payment which represents the value of either a one-time, lump-sum payment or the present value of a royalty stream distributed over the lifetime of the intellectual property asset, the system and method of the present invention can place a discrete monetary value on an intellectual property asset.

15 Claims, 14 Drawing Sheets

U.S. PATENT DOCUMENTS

| | | | |
|---|---|---|---|
| 2002/0046038 A1* | 4/2002 | Prokoski | 705/1 |
| 2002/0072995 A1* | 6/2002 | Smith | 705/27 |
| 2002/0099637 A1* | 7/2002 | Wilkinson et al. | 705/36 |
| 2003/0061064 A1* | 3/2003 | Elliott | 705/1 |
| 2006/0031088 A1* | 2/2006 | Risen et al. | 705/1 |

FOREIGN PATENT DOCUMENTS

| | | | |
|---|---|---|---|
| WO | WO 0193154 | * | 12/2001 |

OTHER PUBLICATIONS

Kempner et al., Many a slip, Sep. 1994; Managing Intellectual property; p. 15 (12 pgs.).*

Smith et al. "Valuation of Intellectual Property and Intangible Assets", 3rd Edition, 2000, pp. 113-125, 132-133, 151-154, and 22.*

"New Company is First to Offer Semiconductor Intellectual Property Valuation Service", Feb. 8, 1999, Business Wire, 3 pgs.*

Johnson, Blake, "How Valuable is Intellectual Property?", Jan. 11, 1999, Electronic News (1991), v 45, n 2252, p. 24(1), 2 pgs.*

Clarke et al. Core-Licensing Primer: From 'A' To 'Free', Mar. 9, 1998, Electronic Engineering Times, p. 20, 4 pgs.*

Reilly, Robert F, "The Valuation of Propietary Technology", Jan. 1998, Management Accounting, v79n7, pp. 45-49, 6 pgs.*

Goering, Richard, "Startup Looks to Put Price tags on IP Cores", Feb. 8, 1999, EE Times, 4 pgs.*

Steffora, Ann, "IP Cores at the Crossroads: Which Business Models Work, Which Don't", Mar. 29, 2999, Electronic News (1991), v45, n 13, p. 14(1), 2 pgs.*

Mard et al. "Intellectual Property Valuation", Apr. 20, 2000, The Fincial Valuation Group, 21 pgs.*

IPValuation.com (Oct. 4, 1999) 15 pgs.*

Steffora, Ann, "The IP Challenge: Startup Led By Industry Execs Shed Light on Deals Surrounding Use of Silicon Intellectual Property", Feb. 8, 1999; BNET.com, 3 pgs.*

* cited by examiner

METHOD FOR VALUING INTELLECTUAL PROPERTY

CROSS-REFERENCE TO RELATED APPLICATIONS

This application is a continuation-in-part of U.S. application Ser. No. 09/726,277 filed Nov. 30, 2000, Now U.S Pat. No. 7,188,069 entitled METHOD OF VALUING INTELLECTUAL PROPERTY, incorporated herein by reference.

BACKGROUND OF THE INVENTION

1. Field of Invention

The present invention relates to methods for determining the value of an intellectual property asset, and more particularly to valuation methods which rely upon the competitive advantage offered by the asset as their foundation.

2. Description of Prior Art

Intellectual property assets have become an increasingly important source of corporate wealth. Estimates of the fraction of total market capitalization in the U.S. comprising intellectual property assets range from fifty percent to over ninety percent, representing trillions of dollars of corporate assets. Valuation is a core task in the management of all assets. Management competency, however, has lagged behind the growing importance of intellectual property assets. Estimates of the underutilization of intellectual property assets in the U.S. range from $100 billion to nearly $1 trillion. There are many reasons for the gap between management competency and the growing importance of intellectual property assets to corporate value. One of the most important of these reasons is the lack of adequate methods for the valuation of intellectual property assets.

Marketing, finance, sales and many other management functions depend upon a knowledge of an asset's value. There are a number of well developed and widely accepted methods available for valuing tangible assets. There is no such method available for valuing intellectual property assets. The lack of adequate valuation methods for intellectual property assets impedes their development, use and exchange.

The proper valuation of intellectual property assets is a multi-billion dollar challenge in today's economy. Intellectual property assets should be managed to maximize shareholder value in the same way as tangible assets such as land, buildings, and equipment. Intellectual property assets also need to be valued in the same way as land, buildings, and equipment in order to be properly managed. Unfortunately, the valuation methods which have been developed for tangible property cannot be used with intellectual property because of the lack of established markets for intellectual property assets.

The "market method" is the most reliable measure of tangible property value when it can be used. The market method determines the value of a given tangible asset by the price paid for comparable assets. Use of the market method is dependent on four critical conditions: there must be an active market for substantially similar assets; the transactions must be substantially similar; the parties must deal at arm's length with one another; and the prices and terms of the transactions must be available to the public in some form. Unfortunately, the conditions required by the market method do not exist in the context of intellectual property. Intellectual property assets are required by law to be dissimilar; patents must be novel and non-obvious compared to prior art and copyrights must be original works. Although exchanges of patents, copyrights and trade secrets occur every day in every industry, these exchanges do not take place through established markets, but are sporadic and specialized. Intellectual property exchanges are generally motivated by strategic advantage, not by trading opportunities, and are unique to the firms involved. There is a wide variety of terms and conditions by which intellectual property can be transferred. Licensing professionals craft agreements to suit the special needs of their clients and rarely are two agreements identical. The greatest disadvantage in using the market method to value intellectual property, however, is the lack of publicly available information on the terms and conditions of exchanges.

A number of different methods have been proposed specifically for the valuation of intellectual property assets. Nevertheless, each of these methods has disadvantages. One "rule of thumb" method is commonly known as the "25% rule." The 25% rule sets the licensor's royalties at 25% of the licensee's net profits derived from the license. The disadvantage of the 25% rule is that one rule cannot value all intellectual property, for all parties, in all situations. An even more simple rule of thumb is the "$50,000 rule." The $50,000 rule states that the average patent in the average patent portfolio has a value of $50,000. The disadvantage of the $50,000 rule is that one value cannot be attributed to all patents, in all portfolios, at all times.

Another method proposed for valuation of intellectual property assets is the "top-down" method. The top-down method begins by calculating the market value of a firm, either from the price of its outstanding common stock, in the case of a public company, or from substitute measures such as price-earnings ratios or net cash flows, in the case of a private company. The total value of the firm's tangible assets, including land, buildings, equipment and working capital, is then subtracted from the market value of the firm and the remainder is the total value of the firm's intangible assets. The primary disadvantages of the top-down method are that is does not distinguish between intangible asserts, such as goodwill, and intellectual property assets, such as patents, and cannot be used to value individual or distinct groups of intellectual property assets. The top-down method also does not provide a means for differentiating among different types of intangible assets, or apportioning market value among distinct sets of intellectual property assets.

A variation of the top-down method is the known as the "tech factor method." The tech factor method associates core patents with different business divisions of the firm, and then allocates the business divisions' total net present value among the core patents based on an industry specific standard percentage. One disadvantage of the tech factor method is that it does not account for the effect of intellectual property assets other than patents on a business division's total net present value. Another disadvantage is that the method cannot value individual patents, or groups of patents, differently. All patents associated with the same business division will have the same value.

Another approach to valuing intellectual property assets is the "knowledge capital scorecard." The knowledge capital scorecard first subtracts from a firm's annual normalized earnings the earnings from tangible and financial assets. The remainder of the earnings, which are generated by "knowledge assets," is divided by a knowledge capital discount rate to calculate the value of intellectual property assets. One disadvantage of the knowledge capital scorecard is that it does not separate the different types of "knowledge assets," such as management skill and patented processes. Another disadvantage is that the method cannot value individual knowledge assets, or groups of knowledge assets, differently.

The most recent methods which have been proposed for valuation of intellectual property assets use mathematical or economic models. The "Monte Carlo analysis" attempts to value intellectual property assets based on a probability weighted distribution of alternative possible values. "Black-Scholes option analysis" attempts to value intellectual property assets based on the value of future strategic options which a firm possesses as a result of owning the intellectual property asset. The disadvantages of these methods are that they are very complex, require substantial technical and computing resources, and depend on large amounts of detailed data and use coarse measurements within sophisticated formulas.

Finally, the Technology Risk Reward Unit (TRRU) valuation method is a modification of Black-Scholes option pricing model. The TRRU method combines data on the cost of completing technology development, the time required to bring the technology to market, the date of patent expiration, the marketplace value of the technology, the variability of the value estimate, and a risk-free interest rate to determine a suggested value for an intellectual property asset. The TRRU method uses a proxy value to calculate the mean intellectual property asset value with an industry sector. The proxy value is calculated by dividing the market capitalization value of each company included in the industry sector by the number of products the company offers in the market and averaging the quotients from all of the companies in the industry sector. The TRRU method also uses an Intangible Asset Market Index (IAM) to adjust the marketplace value of an intellectual property asset. The IAM tracks broad industry segments, such as health care and automobiles, and industry subgroups within each segment, such as imaging equipment and automotive glass, to measure macroeconomic changes in a market which could affect the value of an intellectual property asset. The disadvantage of the TRRU method is that it does not account for different types of intellectual property assets and does not differentiate between intellectual property assets representing minor and major advances in a field.

3. Objects and Advantages

It is therefore a principal object and advantage of the present invention to provide a methodology that can be used to distinguish among different types of intellectual property assets, to value individual or sets of related intellectual property assets, and to value intellectual property assets consisting of minor and major advances in a field differently.

A further object and advantage of the present invention is to provide a methodology that can be implemented with a minimum amount of information generally available to the public and that can also be implemented with information generated through proprietary research and analysis thus allowing the user to decide the trade-off between cost and relative accuracy of the valuation on a case-by-case basis.

An additional object and advantage of the present invention is to provide a methodology that can be used for valuing early-stage technologies, planning development of pre-market products, negotiating licensing transactions, and selecting among research and development investments.

With regard to valuing early-stage technologies, the present invention has the object and advantage of being able to calculate the competitive advantage of an early-stage technology and to predict its market share and present value.

With regard to planning the development of pre-market products, the invention has the object and advantage of being able to value different product configurations to determine which provides the greatest return on total investment.

With regard negotiating licensing transactions, the invention has the object and advantage of being able to calculate the value of a license to a licensor and a licensee, of calculating a license payment which provides a licensor and a licensee an equal percentage rate of return on their respective investments in the license, of adjusting a license payment for the relative risk assumed by a licensor and a licensee, of adjusting a license payment for licenses to a competitor and a non-competitor, and of adjusting a license payment for an exclusive, limited exclusive, or non-exclusive license.

With regard to selecting among research and development investments, the invention has the object and advantage of calculating the return on investment in the creation of new intellectual property assets incorporated in existing or new products.

Other objects and advantages of the present invention will in part be obvious, and in part appear hereinafter.

SUMMARY OF THE INVENTION

In accordance with the foregoing objects and advantages, the competitive advantage valuation method of this invention comprises a series of modular associations and calculations that ultimately determine the value of an intellectual property asset. By calculating the proportional contribution of an intellectual property asset to the competitive advantage of a related product in a real market, a discrete value can be placed on the intellectual property asset.

The fundamental premise of the present invention is that the value of an intellectual property asset can be calculated from the competitive advantage that it contributes to a discrete product that competes in a marketplace. The methodology of the present invention first associates the intellectual property asset with a related product that embodies the intellectual property asset. After a set of competition parameters that define the product are identified, the product is quantitatively compared to competing products in the marketplace to determine its overall competitive advantage relative to those competing product. The competitive advantage contribution of the intellectual property asset relative to the total competitive advantage of the product is calculated based upon a quantitative comparison to the other intellectual property assets that are embodied in the same product and in competing products. Based upon the relative competitive advantage contribution of the intellectual property asset to the overall competitive advantage of the product, a percentage of the overall value of the product is assigned to the intellectual property asset.

A determination of the competitive advantage that an intellectual property asset can contribute to a product in the market place can be used to calculate more than just the value of that asset. The methodology may also be used to predict the market share that a product embodying a specific set of intellectual property assets will eventually achieve once introduced into the marketplace. The competitive advantage methodology also forms the basis for calculation of the value of a license of an intellectual property asset to both the licensor and the licensee or licensees. The calculation of competitive advantage is also integral to valuing a new intellectual property asset that is an improvement over or replacement of an existing intellectual property asset.

BRIEF DESCRIPTION OF THE DRAWINGS

The present invention will be more fully understood and appreciated by reading the following Detailed Description in conjunction with the accompanying drawings, in which.

DETAILED DESCRIPTION

The method of this invention comprises a series of associations and calculations that determine the value of an intellectual property asset. Specifically, this invention determines the value of an intellectual property asset as a function of the competitive advantage which it contributes to a product. The competitive advantage of a product is viewed as an aggregation of the competitive advantages derived from tangible assets (e.g., land, buildings, equipment, etc.), intangible assets (e.g., goodwill, management expertise, customer relations, etc.) and intellectual property assets (i.e., patents, trade secrets, copyrights, trademarks, and business methods). Thus, to value a discrete intellectual property asset the value of the product that embodies the intellectual property asset must be disaggregated into the fraction of value contributed by tangible assets, the fraction of value contributed by intangible assets and the fraction of value contributed by intellectual property assets. In addition, the fraction of value contributed by intellectual property assets must be disaggregated into the fraction of value contributed by technical intellectual property assets (utility patents, technical trade secrets and software copyrights), the fraction of value contributed by reputational intellectual property assets (trademarks, service marks and brandnames) and the fraction of value contributed by operational intellectual property assets (business method patents). As many of the associations and calculations are independent or form a basis for later calculations, they do not necessarily need to be performed in any particular order unless noted.

Due to the complexity of the methods and calculations required by the present invention, a computer based spreadsheet, or utility programmed to perform mathematical calculations, such as Microsoft Access, is preferred for implementing the present invention. Alternatively, the appropriate input boxes and underlying formulas may be programmed into a web-based application, such as an html program, for access and use through the internet.

Figure 1:
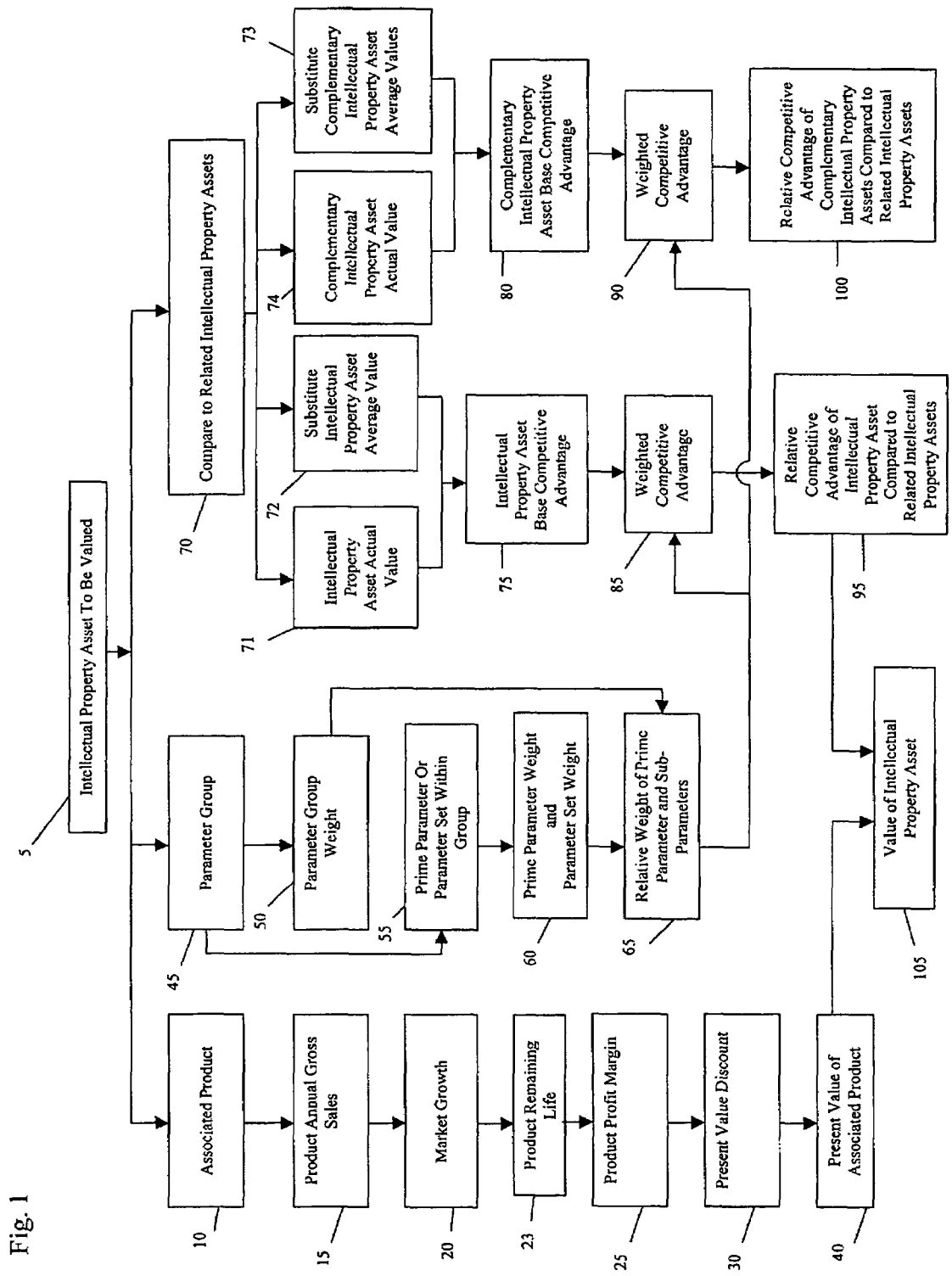
FIG. 1 is a detailed flow chart of a first embodiment of the present invention.
Figure 2:
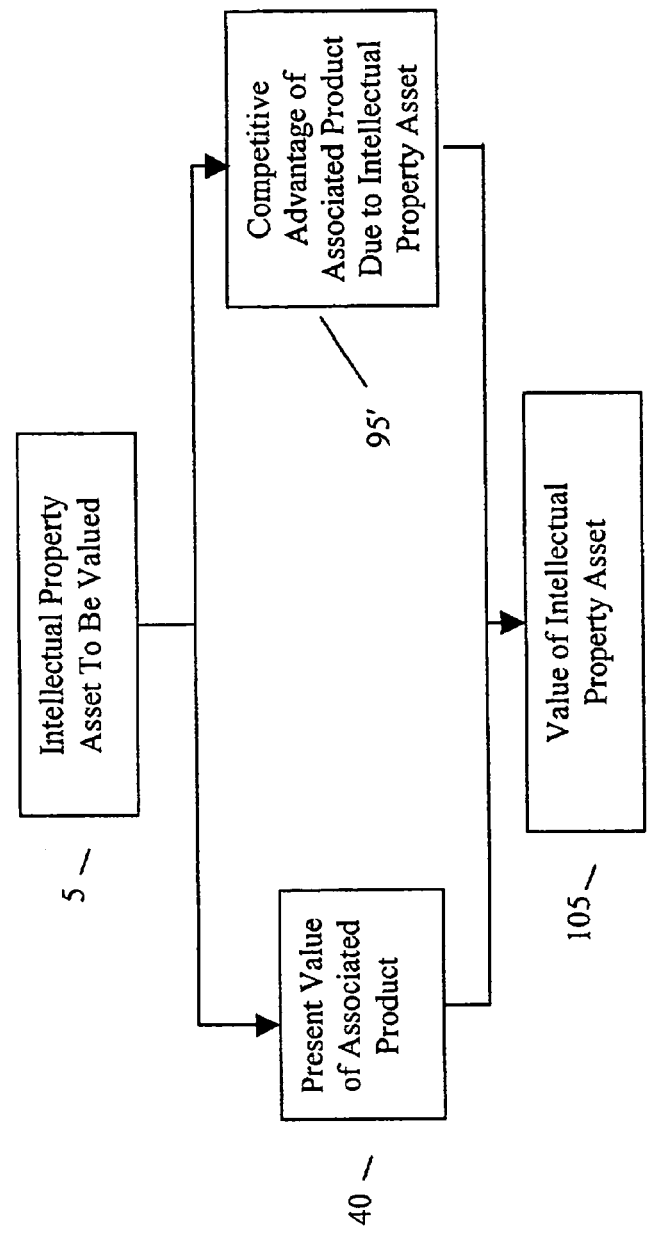
FIG. 2 is a high level flow chart of a first embodiment of the present invention.
Figure 13:
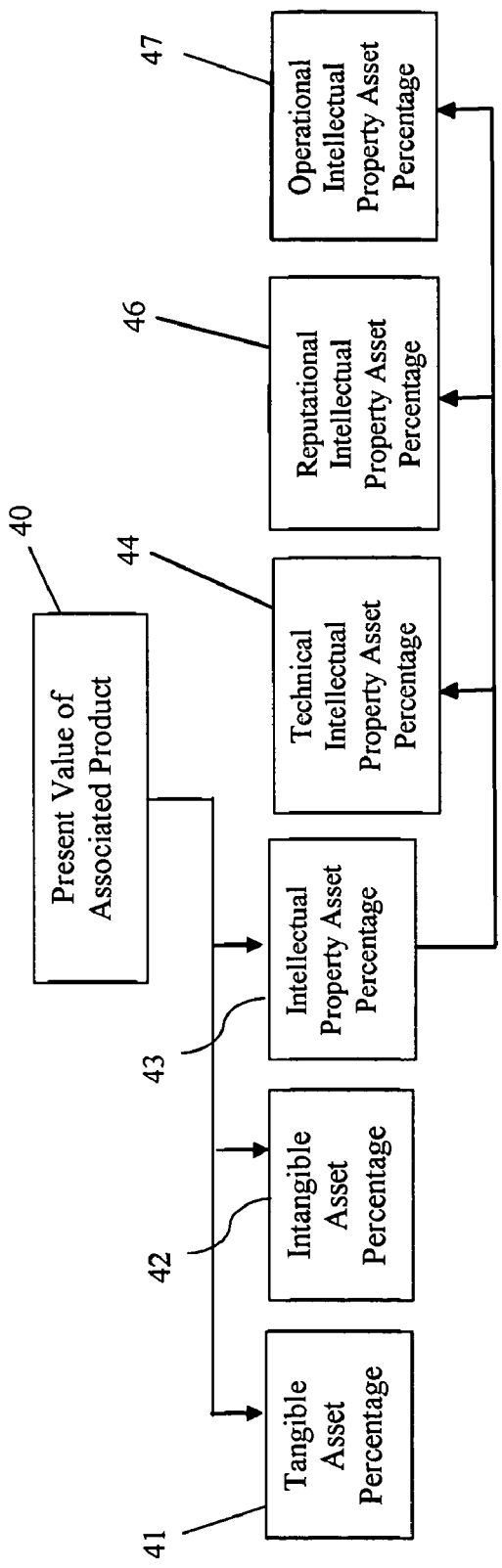
FIG. 13 is a high level flow chart of the disaggregation of the present value of a product according to the present invention.

Referring now to the drawing Figures, wherein like reference numerals refer to like parts throughout, there is seen in FIG. 1 an illustration of the detailed methodology with all requisite steps required for calculating the value of an intellectual property asset (IPA) 5. FIG. 2 illustrates that the basis of the methodology for calculating the value of an intellectual property asset 5 involves the combination of the present value of an associated product 40 incorporating the intellectual property asset, the disaggregation of the product's present value into technical, reputational, and operational intellectual property asset groups, as seen in FIG. 13, and the competitive advantage of the associated product due to the intellectual property asset 95'. From these modules, a value of the intellectual property asset 105 can be determined.

Figure 3:
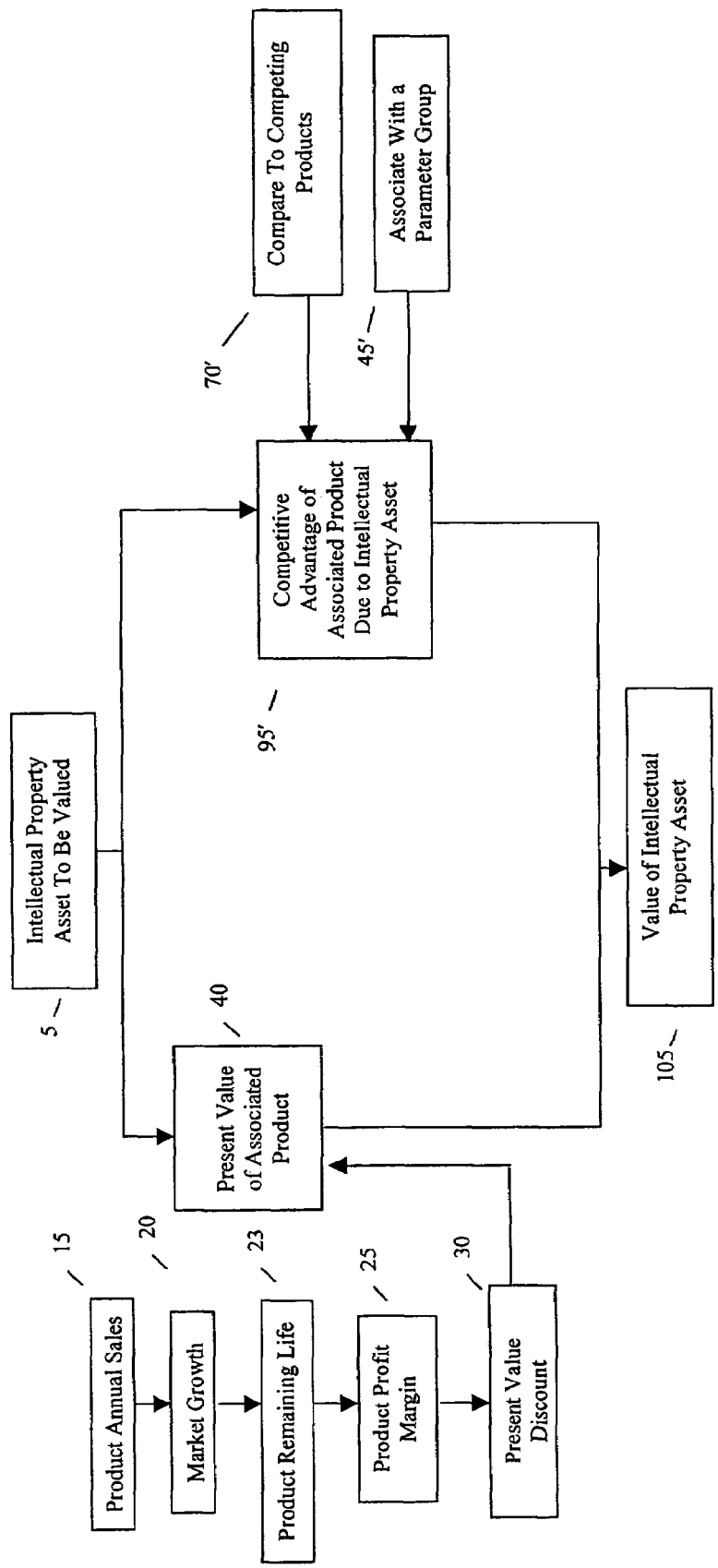
FIG. 3 is an intermediate level flow chart of a first embodiment of the present invention.

FIG. 3 illustrates an intermediate level of the methodology and provides more detail for the steps to be performed in the valuation of an intellectual property asset 5. As illustrated, the competitive advantage of an associated product 95' is a function of: (1) a comparison to competing products 70' based upon parameters relevant to success of associated products in the marketplace, and (2) associating the intellectual property asset 5 with a parameter group 45' to allocate a portion of the competitive advantage. The determination of the competitive advantage of the associated product 95' due to the intellectual property asset 5 allows the value 105 to be determined as a percentage of the disaggregated present value of the associated product 40. The underlying calculations for these modules are illustrated in FIGS. 1 and 13.

According to FIG. 1, the intellectual property asset 5 to be valued is associated with a product (P) 10, and the present value (PV) 40 of the associated product is calculated and disaggregated, as seen in FIG. 13. The present value calculation requires information about the product's annual gross sales (P:GS) 15, the yearly growth of the market (P:MG) 20 as a percent, the length in years of the product's remaining life (P:RL) 23, the product's profit margin (P:PM) 25 as a percent of gross sales, and the applicable present value discount (PVD) 30. This data can be gleaned from public or private data sources and entered into a spreadsheet for easy calculation. The formula for calculating the present value from this data is:

$$P:PV_{1\ldots P:RL} = P:GS \cdot (1+P:MG_{1\ldots P:RL}) \cdot P:PM_{1\ldots RL} \cdot PVD_{1\ldots P:RL}$$

$$P:PV = P:PV_1 + P:PV_2 + P:PV_3 + \ldots P:PV_{PRL}$$

Referring to FIG. 13, the disaggregation of the present value of the associated product 40 among different classes of assets can be performed using data available from a firm's income statement and balance sheet. The measure of the tangible asset percentage (TA %) 41 of a product's present value is calculated by dividing the firm's net book value by the firm's market capitalization value. The measures of the intangible asset percentage (IA %) 42, the intellectual property asset percentage (IPA %) 43, the technical intellectual property asset percentage (TIP %) 44, the reputational intellectual property asset percentage (RIP %) 46, and the operational intellectual property asset percentage (OIP %) 47 of a product's present value use four categories of expenses as indicators of these asset percentages. Sales, general and administrative expense (SG&A) is used as an indicator of the intangible asset percentage. Research and development expense (R&D) is used as an indicator of the technical intellectual property percentage. Advertising expense (AD) is used as an indicator of the reputational intellectual property percentage, and investment in new business processes (BP) is used as an indicator of the operational intellectual property percentage. These categories of expenses are compared to one another to calculate their fractional contribution to a product's net present value. The default formulas for calculating these asset percentage values are:

$$IA\% = (SG\&A - AD - BP)/((SG\&A + R\&D) \times (100\% - TA\%))$$

$$IPA\% = (R\&D + AD + BP)/((SG\&A + R\&D) \times (100\% - TA\%))$$

$$TIP\% = R\&D/((R\&D + AD + BP) \times IPA\%)$$

$$RIP\% = AD/((R\&D + AD + BP) \times IPA\%)$$

$$OIP\% = BP/((R\&D + AD + BP) \times IPA\%)$$

Advertising and business process expenses are generally included in sales, general and administrative expenses, and therefore must be subtracted out to calculate the intangible asset percentage.

The intellectual property asset 5 is also associated with one of the three primary parameter groups 45 based on the type of intellectual property that is being valued. The three parameter groups are technical, reputational and operational, and each includes a distinct group of intellectual property assets. The technical group includes utility patents (not including method of business patents), functional software copyrights, and technical trade secrets. The reputational group includes trademarks, trade names and brand names. The operational group includes business method patents and proprietary business processes. If the intellectual property asset to be valued is a utility patent, then the technical parameter group should be evaluated. Similarly, if the asset is a trademark or business method, then the reputational or operational groups should be evaluated, respectively.

Once the association is made, a parameter group weight, (TP'G:W), (RP'G:W), or (OP'G:W) 50, i.e. technical, reputational, or operational parameter group weight, respectively, is calculated from data obtained about expenditures on research and development (R&D$), advertising (AD$), and business innovation (BI$). The default formulas for determining the technical parameter group weight (TP'G:W), reputational parameter group weight (RP'G:W), and operational parameter group weight (OP'G:W) are:

$$TP'G:W = R\&D\$/(R\&D\$ + AD\$ + BI\$)$$

$$RP'G:W = AD\$/(R\&D\$ + AD\$ + BI\$)$$

$$OP'G:W = BI\$/(R\&D\$ + AD\$ + BI\$)$$

The parameter group weights 50 allow a portion of the present value of the associated product 40 to be allocated to one of the three distinct groups of intellectual property assets. The value of a given intellectual property asset is thus calculated relative to the value of its related intellectual property group at the exclusion of the other groups. For example, a patent, i.e., a technical group asset, that is associated with a product can be valued independently despite the presence of a strong trademark, i.e., a reputational group asset, that would otherwise inflate or deflate a valuation. It is not necessary to weight the intellectual property parameter groups if the product's present value has been disaggregated into fractional values for each type of intellectual property asset.

Within each parameter group there is a prime parameter (PP') and a parameter set (P's) comprised of sub-parameters (SubP'). In the technical parameter group, the prime parameter is price (PrP') and the parameter set is a set of performance parameters (PfP's). Sub-parameters may include any number of relevant or discrete performance capabilities. In the reputation parameter group, the prime parameter is customer recognition (CrP') and the parameter set is a set of customer impression parameters (CiP's). In the operational parameter group, the prime parameter is the operation cost (OcP') and the parameter set is a set of operational efficiency parameters (OeP's).

According to the methodology, the prime parameter and parameter set must be weighted 60 based on the number of parameters (NP') contained in the parameter group. The prime parameter weight equals the parameter set weight when the total number of parameters is two. The prime parameter weight decreases and the parameter set weight increases as the number of sub-parameters increases. This adjustment is necessary to limit the increase in the prime parameter weight due solely to the increase in the number of sub-parameters in the parameter set. The percentage decrease in prime parameter weight and percentage increase in parameter set weight is based on a multiple (M) of the number of parameters. The default value for M is five. The default formulas for calculating the prime parameter weight and the parameter set weight are:

$$PP':W = 0.50 \times (1 - ((M \times NP')/100))$$

$$P'S:W = 0.50 \times (1 + ((M \times NP')/100))$$

If sub-parameters exist, their respective weights can be determined as fractions of the parameter set weight.

Once the prime parameter weight and parameter set weight have been determined 60, their relative weights 65 can then be calculated using the parameter group weight 50 determined earlier. The formulas are:

$$PP':RW = PP':W \times P'G:W$$

$$SubP':RW = (P's:W \times P'G:W)/(NP'-1) \text{ [if SubP':Ws are equal]}$$

$$SubP':RW = (SubP':W/P's:W) \times P'G:W \times P's:W \text{ [if SubP':Ws are not equal]}$$

Another step of the methodology is to calculate the relative competitive advantage 95 of the intellectual property asset 5 as compared to related intellectual property assets 70. There are two types of related intellectual property assets: substitute intellectual property assets (SIPA) and complementary intellectual property assets (CIPA). Substitute intellectual property assets are intellectual property assets incorporated in competing products which are associated with the same competition parameter as the intellectual property asset 5 to be valued. Complementary intellectual property assets are intellectual property assets incorporated in the associated product 10 which are associated with the same parameter group as the intellectual property asset 5 to be valued. These assets are compared based upon quantifiable parameter measures that define the asset and are relevant to product sales in the marketplace.

There are three types of parameter measures: physical measures, psychological measures and estimation measures. Physical measures provide the most objective parameter comparisons and should be used whenever possible. Some parameters, such as design aesthetics, cannot be physically measured. For these parameters, psychological measures should be used and can be based on consumer focus groups. When it is not possible or too costly to obtain physical or psychological measures, estimation measures can be used. Estimation measures are generally based on a numerical scale.

Some parameters might be interdependent, for example size and weight, and the combination of these parameters might produce different values than if the parameters were valued separately as the methodology does by default. Statistical analysis or neural network software can be used to analyze the independence or interdependence of parameters. Regardless, a spreadsheet can be used to organize all of the parameter data for the sets of substitute intellectual property assets and complementary intellectual property assets and the formulas can be entered for easy calculation.

The methodology generally calculates the relative competitive advantage 95 of the intellectual property asset 5 in three steps. First, base competitive advantages 75, 80 are calculated for the intellectual property asset 5 and each complementary intellectual property asset by comparing these assets to competing assets. Second, weighted competitive advantages 85, 90 are calculated for the intellectual property asset to be valued and each complementary intellectual property asset by factoring the base competitive advantages 75, 80 by the corresponding relative parameter weight 65. Third, relative competitive advantages 95, 100 are calculated for the intellectual property asset to be valued and each complementary intellectual property asset by dividing the weighted competitive advantages 85, 90 of each by the sum of the weighted competitive advantages.

The detailed methodology for calculating the base competitive advantages 75, 80, first calculates an average value (AvV) 72 for the substitute intellectual property assets and for the substitute complementary intellectual property assets (SCIPA) 73, and then compares these average values 72, 73 to the actual values (AcVs) 71, 74 of the intellectual property asset and complementary intellectual property assets to determine the base competitive advantages 75, 80 as a percentage variation. The substitutes for the complementary intellectual property assets are intellectual property assets incorporated in competing products which are associated with the same competition parameters as the complementary intellectual property assets. The values represent quantitative measurements of the characteristic of the product, such as size, weight, speed, etc., if relevant in the marketplace. The formulas are as follows:

$$IPA:BCA=(IPA:AcV-SIPA:AvV)/SIPA:AvV$$

$$CIPA:BCA=(CIPA:AcV-SCIPA:AvV)/SCIPA:AvV$$

The next step in determining the relative competitive advantages 95, 100 is to calculate weighted competitive advantages (WCA) 85, 90 for the intellectual property asset to be valued (IPA:WCA) and the complimentary intellectual property assets (CIPA:WCA) using the relative parameter weights calculated earlier 65. The formulas are as follows:

$$IPA:WCA=IPA:BCA \times IPA:P':RW$$

$$CIPA:WCA=CIPA:BCA \times CIPA:P':RW$$

The formulas for calculating the intellectual property asset's relative competitive advantage (IPA:RCA) 95 and complementary intellectual property assets' relative competitive advantage (CIPA:RCA) 100 first calculate a total weighted competitive advantage (T:WCA) for the parameter group. The total weighted competitive advantage for the parameter group is the sum of all of the weighted competitive advantages of the intellectual property asset to be valued and the complementary intellectual property assets. The relative competitive advantages 95, 100 are calculated by dividing the weighted competitive advantage 85, 90 by the total weighted competitive advantage and then multiplying the quotient by the associated parameter group weight (P'G:W) 50 determined earlier. The formulas for calculating an intellectual property asset's relative competitive advantage 95 and a single complementary intellectual property asset's relative competitive advantage 100 are:

$$IPA:RCA=(IPA:WCA/T:WCA) \times P'G:W$$

$$CIPA:RCA=(CIPA:WCA/T:WCA) \times P'G:W$$

The final step in the methodology is to calculate the value of the intellectual property asset (IPA:V) 105 from the product's present value (P:PV) 40 and the intellectual property asset's relative competitive advantage (IPA:RCA) 95 compared to related intellectual property assets. The value of complementary intellectual property assets (CIPA:V) can also be determined from the product's present value 40 and the complementary intellectual property assets' relative competitive advantages (CIPA:RCA) 100. The formulas are as follows:

$$IPA:V=P:PV \times IPA:RCA$$

$$CIPA:V=P:PV \times CIPA:RCA$$

If the intellectual property asset 5 is associated with multiple products, an intellectual property asset value 105 can be calculated for each product and the results summed to calculate a total intellectual property asset value. If the intellectual property asset 5 is associated with multiple parameters, the intellectual property asset's relative competitive advantage 95 is calculated for each parameter and the results are summed to calculate total value. If multiple intellectual property assets are associated with a single parameter, a relative competitive advantage 95 is calculated for that parameter and divided among the intellectual property assets to calculate their individual values.

Figure 14:
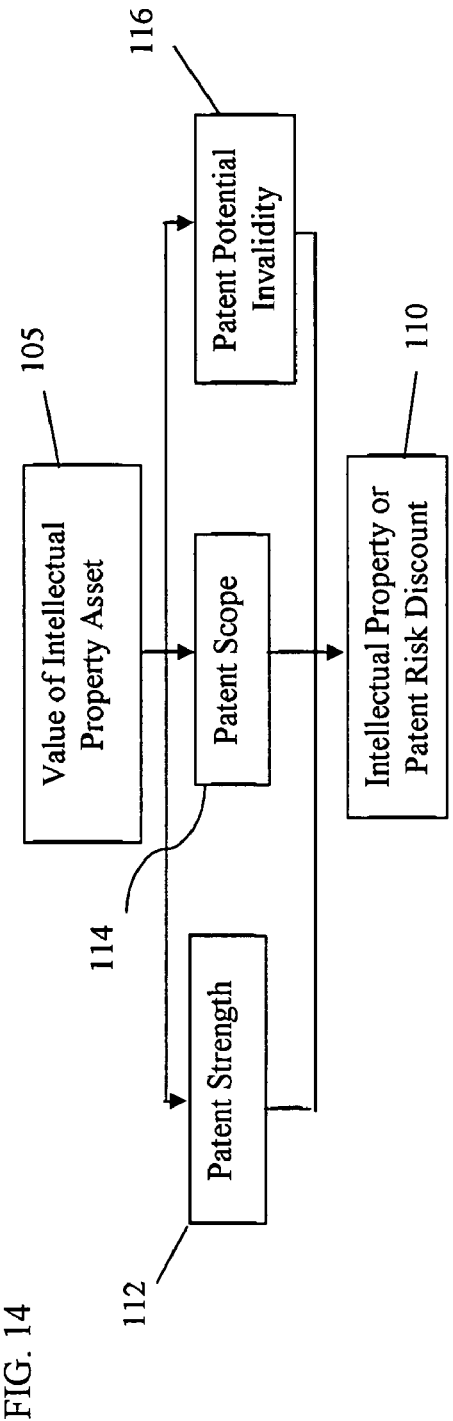
FIG. 14 is a high level flow chart of an intellectual property risk discount according to the present invention

Referring to FIG. 14, the value of an intellectual property asset 105 can also be adjusted for intellectual property risk, which is most often done when valuing a patent. An intellectual property or Patent Risk Discount (PRD) 110, is calculated as a function of a patent's strength (PatStrength) 112, a patent's scope (PatScope) 114, and a patent's potential invalidity (PatInvalid) 116. Surrogate measures are used for these three variables and default values are assigned to these three variable based on the average value for a patent on each of these measures. The surrogate measure of PatStength 112 is the number of claims in the patent and the default value for the number of claims in an average patent is 20. The surrogate measure of PatScope 114 is the number of prior art references in the patent and the default value for the number of prior art references in an average patent is 13. The surrogate measure for PatInvalid 116 is the percentage of patents found invalid in patent infringement suits and the default value for the average number of patents found invalid in patent infringement suits is 46%. The formula for calculating the Patent Risk Discount 110 is:

$$PRD=(PatScope/PatStrength) \times PatInvalid$$

Figure 4:
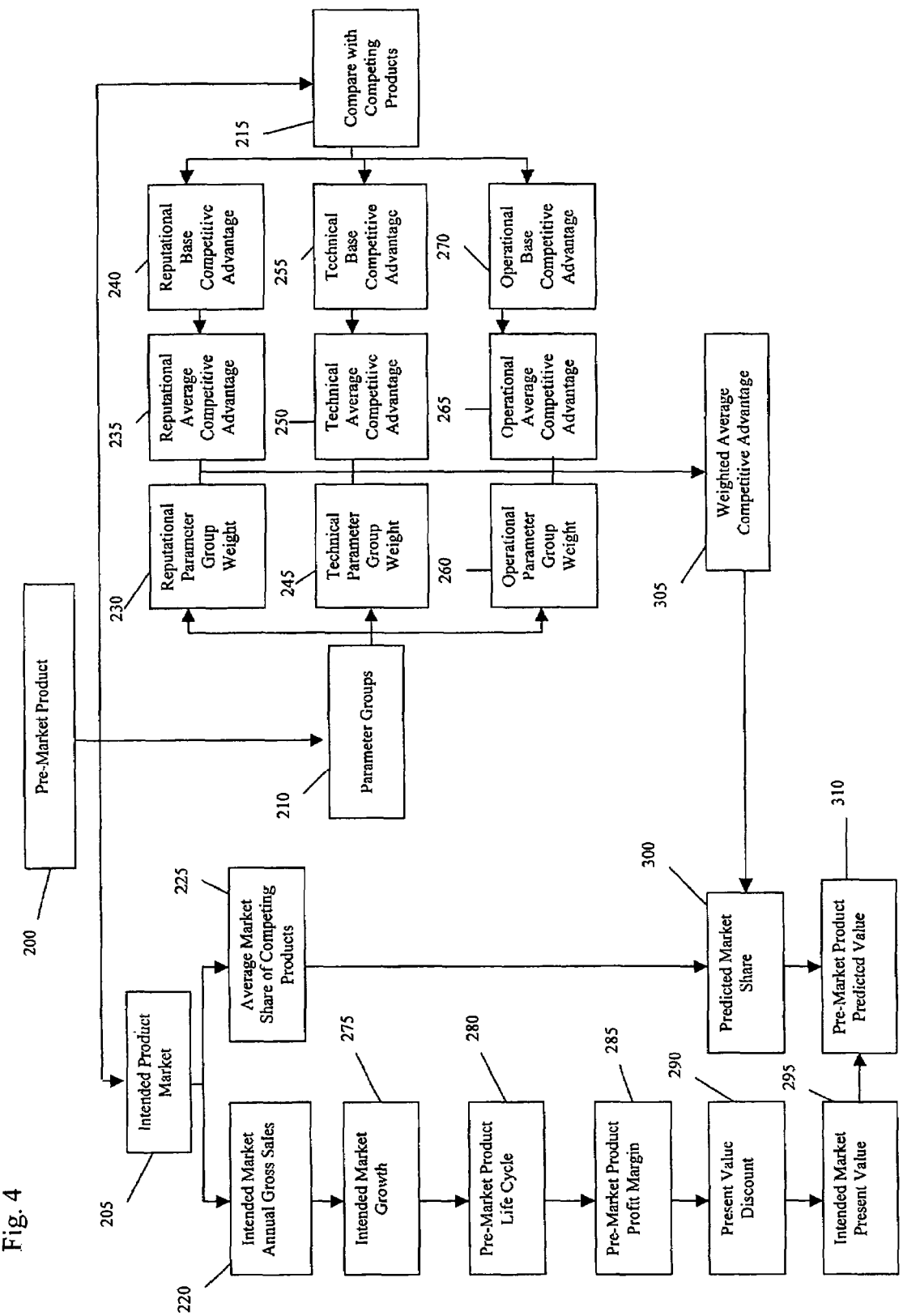
FIG. 4 is a detailed flow chart of a second embodiment of the present invention.
Figure 5:
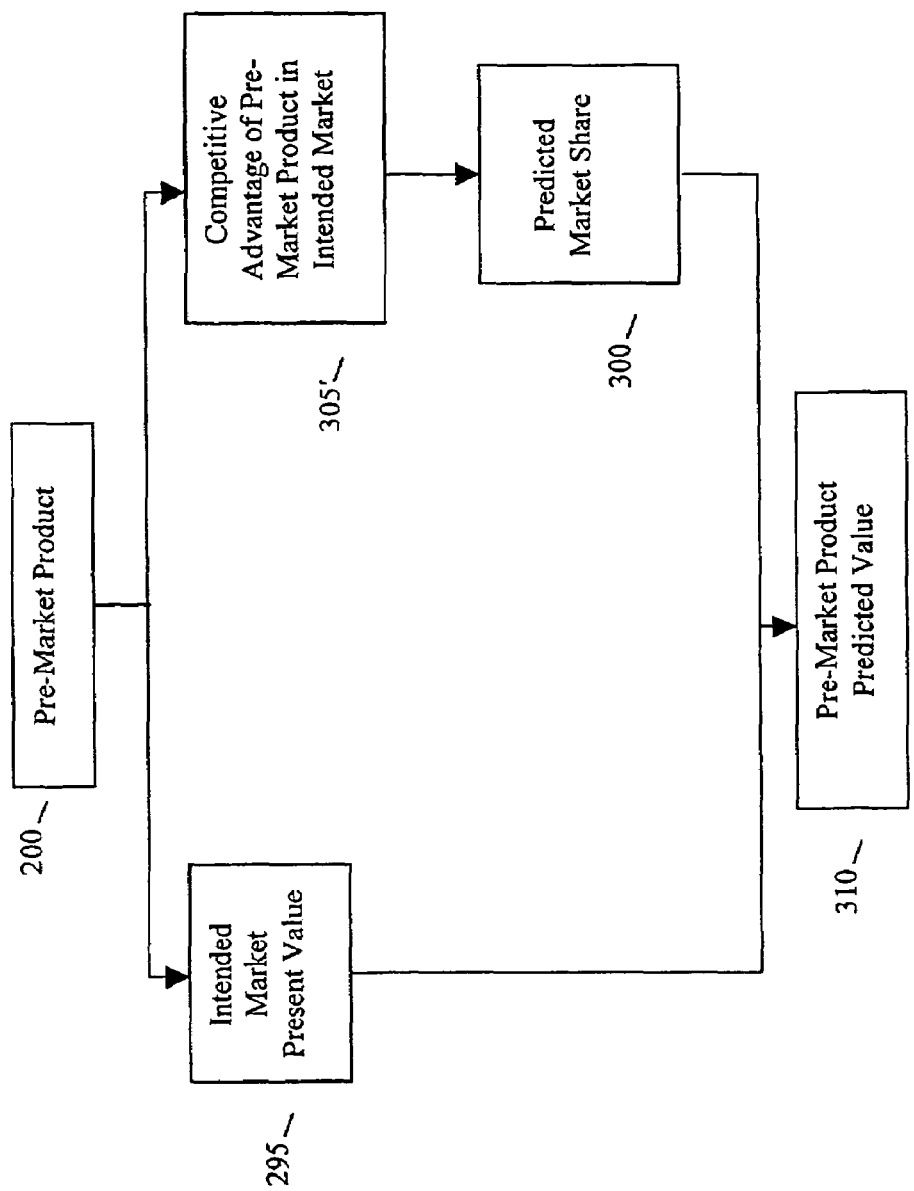
FIG. 5 is a high level flow chart of a second embodiment of the present invention.
Figure 15:
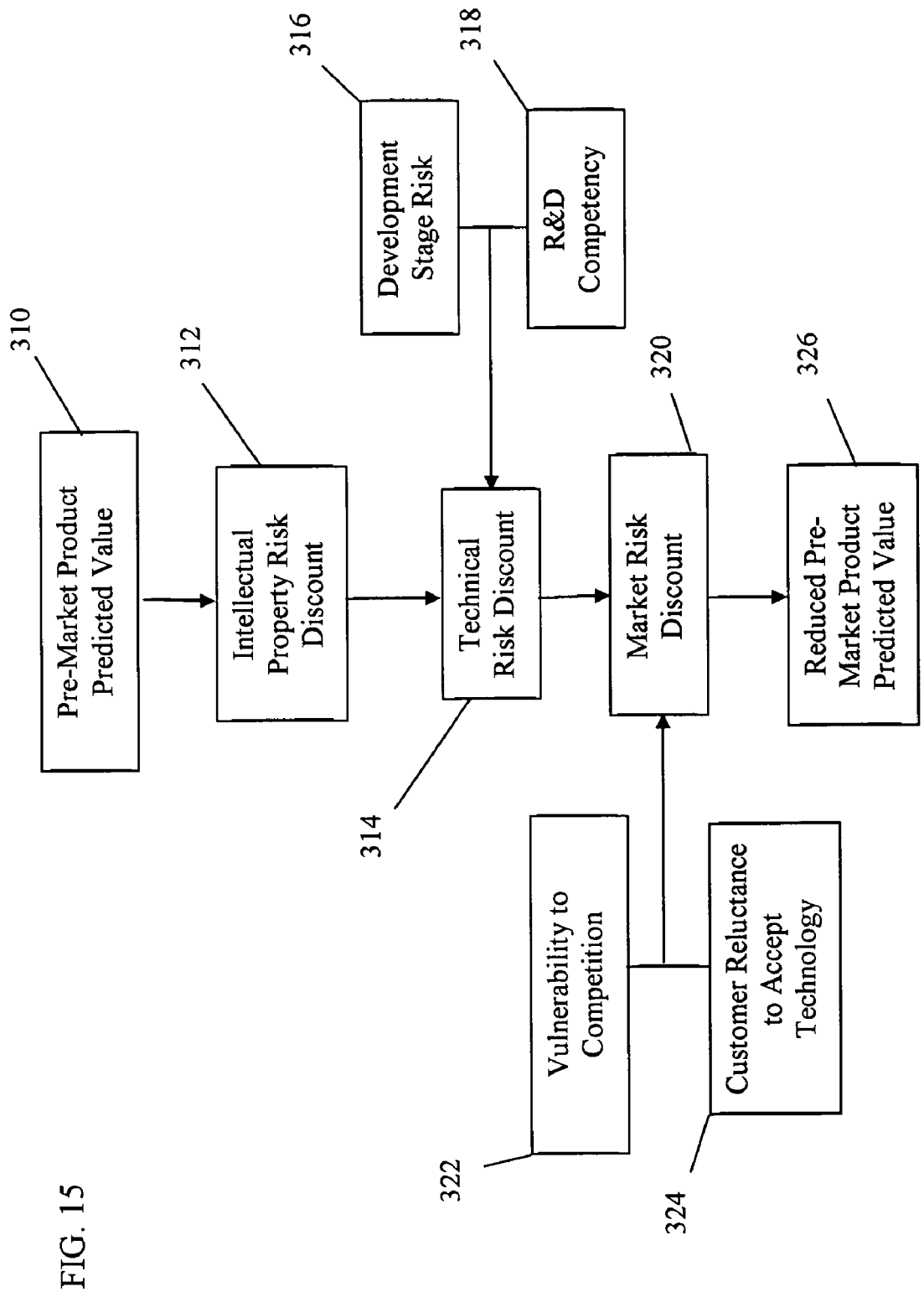
FIG. 15 is a high level flow chart of the discounting of a pre-market product present value according to the present invention.

FIG. 4 illustrates in detail how the methodology can be used to determine the value of a pre-market product (PMP) 200. FIG. 5 illustrates that the primary modules necessary for computing the pre-market product predicted value 310 are: (1) the present value of an intended market 295 for the pre-market product, (2) the competitive advantage 305 of the pre-market product in the intended market, and (3) the predicted market share 300 of the pre-market product 200 in its intended market. The pre-market product predicted value 310 may be discounted for various risks, as seen in FIG. 15.

Figure 6:
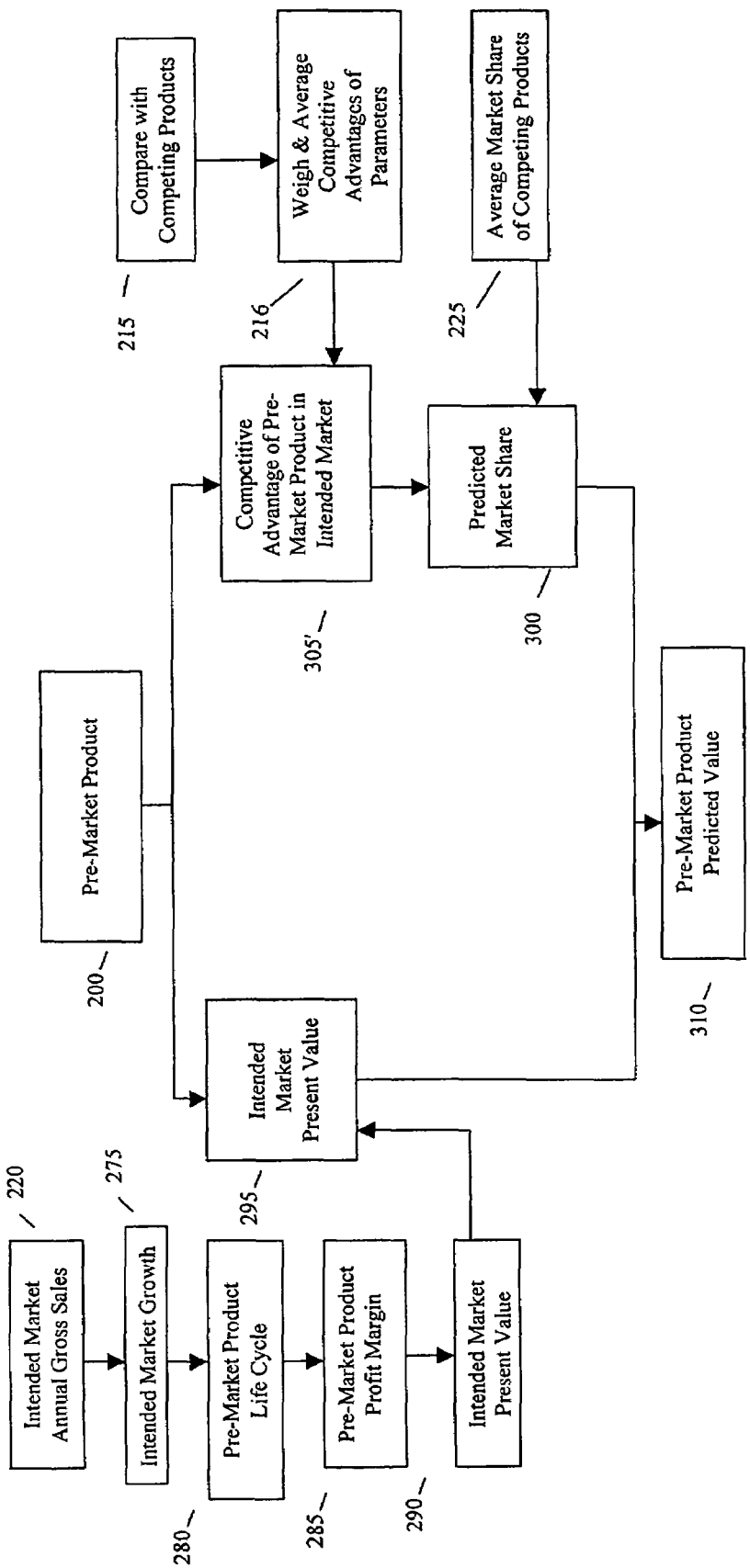
FIG. 6 is an intermediate level flow chart of a second embodiment of the present invention.

According to FIG. 6, the intended market present value 295 is calculated as a function of the intended market annual gross sales 220, the intended market growth 275 annually as a percentage, the pre-market product life cycle 280, the pre-market product profit margin 285 as a percent of gross sales, and an applicable present value discount 290. The competitive advantage 305 of the pre-market product is computed by comparing the pre-market product to competing products 215 on each of the identified relevant competition parameters. For each parameter, the target value for the pre-market product is compared to the average value for competing products and the results are weighed and averaged 216 to determine the competitive advantage of the pre-market product in the intended market 305'. Finally, the pre-market product's predicted market share 300 is calculated by comparing the competitive advantage of the pre-market product in the intended market 305' and the average competitive advantage of competing products 225. The pre-market product predicted value 310 is computed by multiplying the pre-market product predicted market share 300 by the intended market present value 295.

FIG. 4 describes in detail the steps and calculations required for each of the modules in determining the predicted value of the pre-market product 310'. One step is to associate the pre-market product 200 with an intended market (PM) 205 where the pre-market product will eventually be placed. After the association with an intended market 205, it is possible to determine the intended market present value (PM:PV) 295 from information about the market obtained from outside sources. The information that is needed is the current annual gross sales (PM:GS) 220 in the market in dollars; the market growth (PM:MG) 275 as a percent each year; the estimated pre-market product life cycle (PMP:LC) 280; the pre-market product profit margin (PMP:PM) 285 as a percentage of sales; and the appropriate present value discount (PVD) 290. The formula for calculating the product market present value 295 is:

$$PM:PV_{1\ldots PMP:LC} = PM:GS \times (1+PM:MG_{1\ldots PMP:LC}) \cdot times.PMP:PM_{1\ldots PMP:LC} \times PVD_{1\ldots PMP:LC}$$

$$PM:PV = PM:PV_1 + PM:PV_2 + PM:PV_3 + \ldots PM:PV_{PMP:LC}$$

The product market present value 295 is a summation of the product market's present value for each year of the pre-market product life cycle 280.

Another step is to associate the pre-market product 200 with the three intellectual property parameter groups 210. These parameter groups are the reputational, technical, and operational parameter groups discussed above. Tangible and intangible assets are not considered in this calculation. The competitive advantage of the pre-market product attributable to tangible and intangible assets relative to the competitive advantage of an average substitute product attributable to tangible and intangible assets is assumed to be zero. From this association 210, it is possible to calculate the reputational parameter group weight (RP'G:W) 230, technical parameter group weight (TP'G:W) 245, and operational parameter group weight (OP'G:W) 260. The parameter group weights 230, 245, 260 are calculated from information obtained about expenditures on research and development (R&D$), advertising (AD$), and business innovation (BI$). The formulas are:

$$TP'G:W = R\&D\$/(R\&D\$+AD\$+BI\$)$$

$$RP'G:W = AD\$/(R\&D\$+AD\$+BI\$)$$

$$OP'G:W = BI\$/(R\&D\$+AD\$+BI\$)$$

Another step is to associate the pre-market product with a price parameter (P'P) and to calculate the weight of the price parameter (P'P:W). The default weight of the price parameter is thirty percent (30%). The weights of the intellectual property parameter groups are reduced so that the total weight of the price parameter plus the intellectual property parameter groups does not exceed one hundred percent (100%).

the next step is to calculate the base competitive advantages for each parameter group, i.e., the reputational base competitive advantage 240, the technical base competitive advantage 255, and the operational base competitive advantage 270. It is also necessary to calculate the base competitive advantage for the price parameter (P'P:BCA). To calculate these base competitive advantages 240, 255, 270, the pre-market product must be associated and compared with competing products (CP) 215. Competing products are products with which the pre-market product will compete in the product market 205. Next, the competing products are compared based upon relevant parameters in the three parameter groups and the price parameter. This comparison can be performed in a spreadsheet, making the calculation of the base competitive advantages 240, 255, 270 simple. The base competitive advantage calculations 240, 255, 270 require that an average value for the competing products (CP:AvV) be calculated for each parameter in the three parameter groups and the price parameter. The average value for each parameter of the competing products is then compared to the target value for the pre-market product (PMP:TV) to calculate the parameter base competitive advantage (P':BCA). The target values are quantitative representations of the parameters, such as a product's weight, size, speed, efficiency, etc., if relevant in the marketplace. The formula for calculating each parameter base competitive advantage is:

$$P':BCA = (PMP:TV - TV - CP:AvV)/CP:AvV$$

Once the parameter base competitive advantages 240, 255, 270 have been calculated, each parameter group average competitive advantage (P'G:ACA) 235, 250, 265 can then be calculated. The average competitive advantage 235, 250, 265 is the sum of all of the parameter base competitive advantages 240, 250, 265 divided by the number of parameters (NP') in that group. The formula for calculating a parameter group average competitive advantage is:

$$P'G:ACA = (P'_1:BCA + P'_2:BCA + P'_3:BCA + \ldots P'_n:BCA)/NP'$$

The average competitive advantage of the price parameter is the base competitive advantage of the price parameter.

Using the average competitive advantages 235, 250, 265, a weighted average competitive advantage (WACA) 305 can be calculated from the reputational, technical, and operational parameter group weights 230, 245, 260 and the price parameter determined earlier. The formula is as follows:

$$PMP:WACA = (TP'G:ACA \times TP'G:W) + (RP'G:ACA \times RP'G:W) + (OP'G:ACA \times OP'G:W) + (P'P:BCA \times P'P:W)$$

Before determining the pre-market product predicted value 310, the predicted market share must be calculated 300. The calculation of the pre-market product predicted market share (PMP:PredMS) 300 begins with the calculation of the product market average market share (PM:AvMS) 225. This calculation is simply one hundred (100) divided by the number of substitute products (NSP), or graphically, PM:AvMS=100/(NSP). To calculate the predicted market share 300, the average market share 225 is multiplied by the weighted average competitive advantage 305 plus one (1) as follows:

$$PMP:PredMS = (1 + PMP:WACA) \times PM:AvMS$$

The final calculation for determining the pre-market product predicted value (PMP:PredV) 310 consists of multiplying the product market present value 295 times the predicted market share 300, or graphically, PMP:PredV=PM:PV-.times.PMP:PredMS.

The valuation of a pre-market product can be used in four related ways. First, the methodology can be used to value different parameter configurations of a pre-market product to determine which configuration provides the greatest return on total investment in the pre-market product. When the method is used in this way, each parameter configuration of pre-market product is viewed as a distinct aggregation of parameter values. Second, the methodology can be used to select among alternative investments in the creation of new intellectual property assets to be incorporated in pre-market products. When the methodology is used in this way, each investment is viewed as a trade among alternative inchoate intellectual property assets. Third, the methodology can be used to position a pre-market product in the product market. When the method is used in this way, each market position is viewed as an alternate set of parameter values. Fourth, the methodology can be used to price a pre-market product in the product market according to the competitive advantage value which PMP provides customers. When the method is used in this way, each market price is viewed as a trade among levels of competitive advantage.

The default calculations in the method assume a one-to-one correlation between a product's average competitive advantage and its market share. If a product enjoys a positive 25% average competitive advantage, the assumption is that the product will have a market share 25% greater than the average market share. If a product has a negative 25% average competitive advantage, the assumption is that the product will have a market share 25% less than the average market share. Financial or statistical analyses and management experience can be used to test and refine the correlation between a product's average competitive advantage and its market share. If these tools are not available, or too costly to use, the default method of one to one between competitive advantage and market share can be applied. The pre-market product predicted value 310 can be adjusted with intellectual property risk discount 312, a technical risk discount 314, and a market risk discount 320. To adjust the pre-market product predicted value 310 for these risks, a risk discount is calculated for each type of risk and these risk discounts are summed to calculate a reduced pre-market product predicted value 326.

The intellectual property risk discount 312 is calculated in the same way as explained above for Patent Risk Discount 110. Technical risk discount (TRD) 314 is calculated as a function of the technology's development stage risk (DSR) 316 and the firm's research and development competency (RDC) 318. The formula for calculating technical risk discount 314 is:

TRD=DSR×RDC

The default value ranges for a technology's development stage risk 316 are found in Table 1 below:

TABLE 1

| Development Stage | Default Risk Value |
| --- | --- |
| Conception | 99%-90% |
| Reduction to Practice | 90%-70% |
| Laboratory Testing | 70%-50% |
| Field Testing | 50%-30% |
| Manufacture Engineering | 30%-10% |
| Commercial Product | 0% |

The development stage risk 316 value range varies depending upon whether the technology is a product, a Class II medical device, a Class III medical device or a new drug.

Research and development competency 318 is calculated as a function of the number of patents issued to the firm in the last three years in the relevant field of art (#PatIssue) and the number of researchers employed by the firm in that field of art (#Researchers). The formula for calculating research and development competency 318 is:

RDC=#Researchers/(2×#PatIssue)

The market risk discount (MRD) 320 is calculated as a function of a firm's vulnerability to competition (VTC) 322 and the likely degree of customer reluctance to accept the technology (CRA) 324. The formula for calculating market risk discount 320 is:

MRD=(VTC+CRA)/2

The firm's vulnerability to competition 322 is calculated as a function of the number of firms in the market (average market share) and is calculated differently for a firm already in a market and for a firm newly entering a market. The assumption is that the higher the average market share and the smaller the firm's market share, the more vulnerable the firm is to competition. For a firm already in a market, vulnerability to competition 322 is calculated as follows:

VTC=1-[(Average Market Share)$^2$/Firm Market Share]

For a firm newly entering a market, vulnerability to competition 322 is calculated as follows:

VTC=1-(3×Average Market Share)

Customer reluctance to accept the technology 324 is calculated using a range of default values for different degrees of technical innovation. The assumption is that the greater the degree of technical innovation the greater reluctance of customers to accept the technology. The customer reluctance to accept the technology 324 default value ranges are in Table 2 below:

TABLE 2

| Degree of Technical Innovation | Default Customer Reluctance Value |
| --- | --- |
| New Science Foundation | 90%-80% |
| New Technology Platform | 80%-50% |
| Major Technical Improvement | 50%-30% |
| Medium Technical Improvement | 30%-20% |
| Minor Technical Improvement | 20%-10% |

Figure 7:
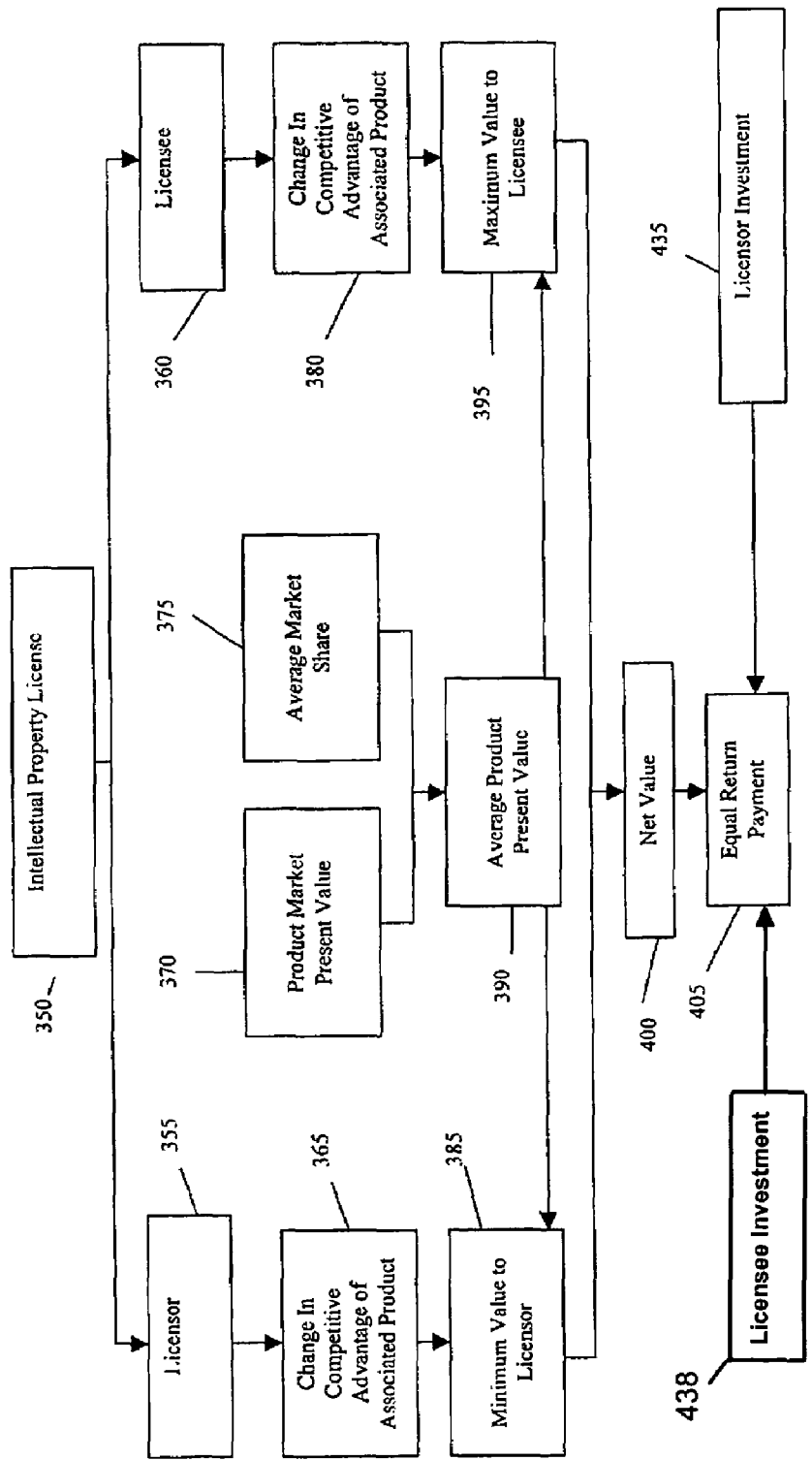
FIG. 7 is a detailed flow chart of a third embodiment of the present invention.
Figure 8:
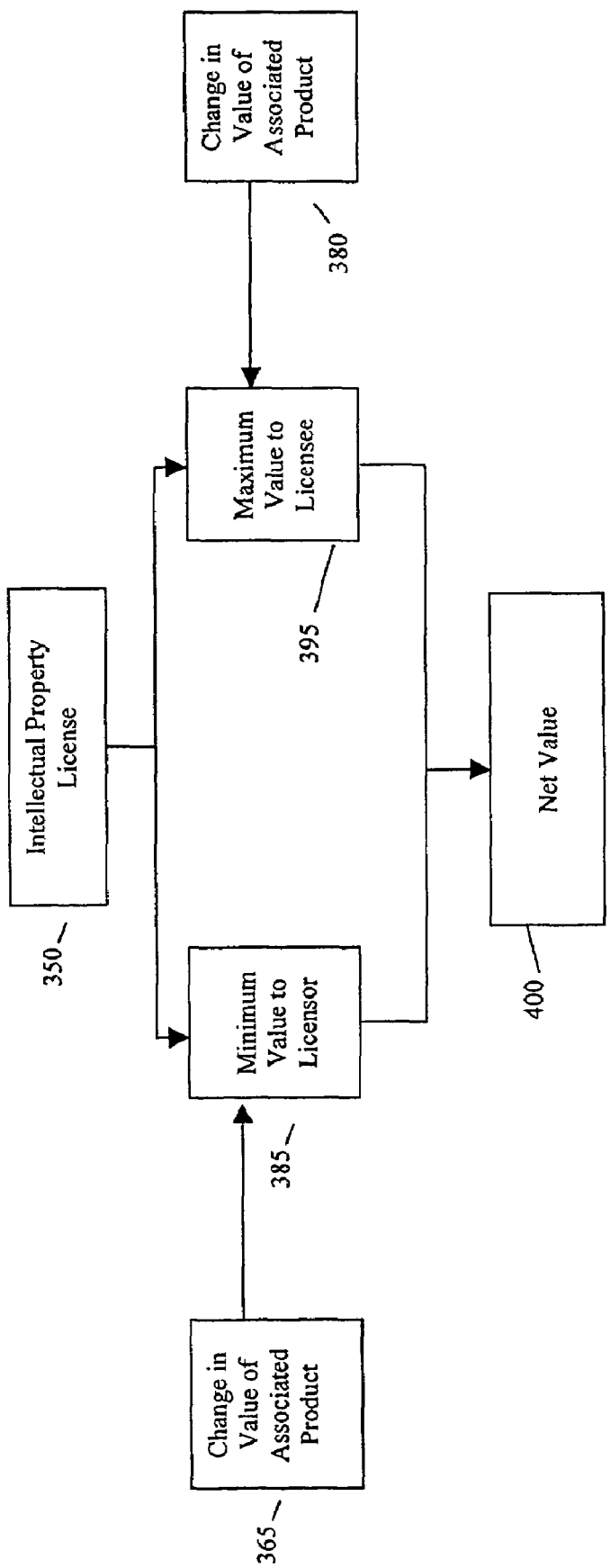
FIG. 8 is a high level flow chart of a third embodiment of the present invention.
Figure 9:
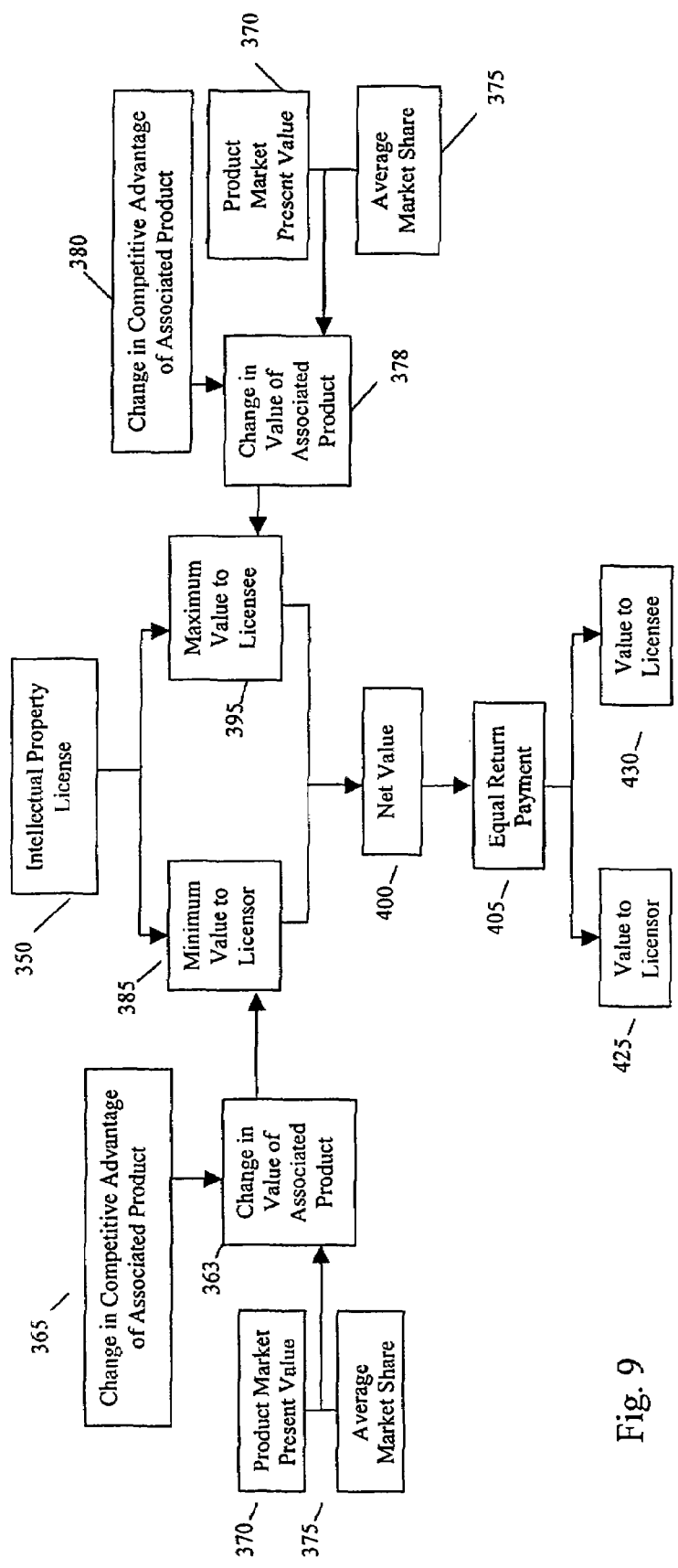
FIG. 9 is an intermediate level flow chart of a third embodiment of the present invention.

FIG. 7 illustrates how the methodology can be used to value an intellectual property license (IPL) 350 between a licensor 355 and licensee 360. FIG. 8 illustrates the high level methodology with the modules required for computing the value of a license to a licensee 395 as a function of the change in value of an associated product 363, 378 that embodies the intellectual property asset being licensed 350. According to FIG. 9, the change in value of an associated product 363, 378 due to the intellectual property asset that is the subject of the license is used to determine the value of the license. The change in value of an associated product 363, 378 is a function of (1) the disaggregated product market present value (disaggregated for type of intellectual property asset being licensed) 370, (2) the average market share 375, and (3) the changes 380, 365 in the competitive advantage of the product as a result of the license. The value of the license 400 is used to determine an equal return payment 405 that provides an equal percentage rate of return on investment to both parties to the license 350 and can be used to calculate percentage running royalty rates and dollar amounts.

According to FIG. 7, the method determines different license values 400 depending on whether the license is to a competitor or a non-competitor, and depending on whether the license is exclusive, a limited exclusive, or a non-exclusive license. In the case of a license to a competitor, the method first calculates the change in competitive advantage of a product 365 of the licensor that embodies the licensed intellectual property asset and the change in competitive advantage of a product 380 of the licensee that will embody the licensed intellectual property asset. This can be accomplished by using the preceding embodiments of the methodology to determine the necessary elements. For example, the licensor's change in competitive advantage (LR:CAΔ) 365 is calculated by subtracting the licensor's average competitive advantage (ACA) with the intellectual property license (LRW:IPL) from the licensor's average competitive advantage without the intellectual property license (LRWO:IPL) and multiplying the difference by the relevant parameter group weight (P'G:W). The formula is as follows:

$$LR:CA\Delta=[(LRWO:IPL):ACA-(LRW:IPL):ACA] \times P'G:W$$

The licensee's change in competitive advantage (LE:CAΔ) 380 is calculated by subtracting the licensee's average competitive advantage (ACA) without the IPL (LEWO:IPL) from the licensee's average competitive advantage with the IPL (LEW:IPL) and multiplying the difference by the relevant parameter group weight (P'G:W). The formula is as follows:

$$LE:CA\Delta=[(LEW:IPL):ACA-(LEWO:IPL):ACA] \times P'G:W$$

It is also necessary to calculate the average product present value (AvP:PV) 390 by multiplying the product market present value (PM:PV) 370 by the average market share (AvMS) 375. The formula is thus:

$$AvP:PV=PM:PV \times AvMS$$

Once the preceding calculations have been made, the minimum value (LR:MinV) 385 to the licensor and the maximum value (LE:MaxV) 395 to the licensee can be determined. The licensor's minimum value 385 is the amount which the licensor must earn to compensate for its loss in competitive advantage due to the license. In other words, the licensor minimum value 385 equals the licensor's loss of product present value due to the license. The licensor minimum value 385 is calculated only if the licensor is a for-profit organization and the licensee is a competitor firm. The licensor minimum value 385 is equal to zero if the licensor is a not-for-profit organization or the licensee is not a competitor firm. The licensor minimum value 385 is calculated by multiplying the licensor's change in competitive advantage 365 by the average product disaggregated present value (disaggregated for the type of intellectual property asset being licensed) 390, or LR:MinV=LR:CAΔ×AvP:PV.

The licensee's maximum value 395 is the maximum amount which the licensee 360 can earn from its increase in competitive advantage due to the license 350. The licensee maximum value 395 must be calculated regardless of licensor 355 status or licensor 355 competition with licensee 360. The licensee maximum value 395 equals licensee's maximum increase in product disaggregated present value (disaggregated for the type of intellectual property asset being licensed) 350. The formula for calculating licensee maximum value 395 is the product of the licensee change in competitive advantage 380 and the average product present value 390, or LE:MaxV=LE:CAΔ×AvP:PV.

The licensor's minimum value and the licensee's maximum value can be adjusted for intellectual property, technical, and market risk in the same way as explained above.

The next step in valuing the intellectual property license 350 is to calculate an equal return payment (ERP) 405. The equal return payment 405 is a lump sum payment by the licensee 360 to the licensor 355 which will provide both the licensee 360 and licensor 355 an equal percentage rate of return on their respective investments in the license 350. The equal return payment 405 assumes that licensor 355 and licensee 360 share an equal risk in the license 350. An equal return payment 405 based solely on licensee sales (i.e., "running royalties") divides risk equally between the licensor 355 and licensee 360. An equal return payment 405 based solely on a lump-sum payment by the licensee shifts risk from the licensor 355 to the licensee 360.

The first step in the calculation of an equal return payment 405 is to calculate the intellectual property license value (LV) 400. The license value 400 is the maximum value of the license 350 to the licensee as calculated above 395.

The next step in the calculation of an equal return payment 405 is to discount the intellectual property license value for intellectual property, technical, and market risk in the same way as explained above.

The next step necessary for determining the equal return payment 405 is to calculate the licensor investment 435 and the licensee investment 438. In the case of license to a competitor, the licensor investment 435 is the sum of the licensor's lost market share (LMS) due to the license and a percentage amount of licensor total investment (TI) in developing the intellectual property asset that is the subject of the license. If the intellectual property asset is currently used by the licensor 355, the licensor total investment 435 is allocated between the licensor's current applications (CA) and the intellectual property license 350. The default allocation divides the licensor total investment 435 equally between the number of current applications (NCA) and the intellectual property license 350. If the intellectual property asset is not currently used by the licensor 355, the full amount of the licensor total investment is allocated to the intellectual property asset. However, if the intellectual property asset is not currently used by the licensor 355, the licensor minimum value will equal zero. Licensing an unused intellectual property asset to a competitor is the same as licensing a used intellectual property asset to a non-competitor. The formula for calculating licensor investment (LR:I) 435 is:

$$LR:I=LMS+(LR:TI/(NCA+1))$$

The final step for determining equal return payment 405 is to calculate the licensee investment 438 in the license (LE:I). The licensee investment 438 in the license is the sum of future research and development (FDC) costs borne by the licensee, the cost of new equipment and training required to implement the license (NET), and the equal return license payment (ERP). The formula for calculating licensee investment 438 is:

$$LE:I=FDC+NET+ERP$$

Using the licensor investment 435, the licensee investment 438 and the license value 400 calculations, an equal return payment 405 can be determined. Equal return payment 405 represents a payment by the licensee 360 to the licensor 355 which provides both parties an equal percentage rate of return on their respective investments in the license 350. The licensor return on investment equals the equal return payment 405 minus licensor investment 435 divided by licensor investment. The licensee return on investment equals the value of the license minus the sum of the future research and development costs, the cost of the new equipment and training to implement the license, and the equal return payment 405 divided by the sum of the future research and development costs, the cost of the new equipment and training to implement the license, and the equal return payment 405. The formulas for calculating the licensor return on investment and the licensee return on investment are as follows::

LR:ROI=(ERP−LR:I)/LR:I

LE:ROI=(IPL:V−(LE:I+ERP))/(LE:I+ERP)

The equal return payment 405 is a measure of the point at which the rate of return on investment to the licensor 355 equals the return on investment to the licensee 360. As the licensor and licensee rate of return on investment are equal, the individual equations can be substituted to solve for the equal return payment 405 as follows:

LR:ROI=LE:ROI (ERP−LR:I)/LR:I=(IPL:V−(ERP+LE:I))/(ERP+LE:I)

Solving for ERP, and ignoring the negative numbers, the formula becomes:

$$ERP = \frac{sqrt\,[(LE:I^2) + 4(LR:I) \times (IPL:NV)] - LE:I}{2}$$

If the equal return payment 405 is paid in the form of a single up-front, lump-sum payment, then the entire license risk is borne by the licensee and the equal return payment 405 must be calculated based on a license value that is fully discounted for intellectual property, technical and market risk. If the equal return payment 405 is paid in the form of running royalties, then the licensor and licensee share the license risk and the equal return payment 405 must be calculated based on a fraction of the intellectual property, technical and market risk. In this case, the value of the license to the licensee will be increased to reflect the license risk assumed by the licensor.

With respect to running royalties, equal return payment 405 can be viewed as the net present value of future royalty payments. The net present value of future royalty payments can be used to calculate the dollar amount of royalty payments that must be paid in each year of the license to equal the net present value and the dollar amount of royalty payments can be used to calculate a running royalty percentage rate based on the licensee's net sales.

The above methodology calculates the value of an exclusive license from a given licensor 355 to a single, given licensee 360. The methodology can also be used to calculate the value of limited exclusive and non-exclusive licenses from given licensor 355 to multiple licensees 360. When used to calculate the value of a limited exclusive and non-exclusive licenses to competitors, the licensor minimum value 385 and licensees' maximum values 395 must take into account the use of the technology by the multiple licensees. The greater the number of licensees, the higher the licensor minimum value 385 will be and the lower the licensees' maximum values 395 will be. The equal return payment 405 can be calculated based on the licensees' average maximum value or the equal return payment 405 can be calculated for each licensee based on that licensee's competitive advantage change 380.

The methodology can also be used to calculate the value of a license 350 when the licensee 360 grants the licensor 355 a cross license. Under these circumstances, the licensor's minimum value 385 would be reduced by the competitive advantage gain to the licensor from the cross license, and the licensee's maximum value 395 would be reduced by the licensee's loss of competitive advantage due to the cross license. The formula can be similarly adjusted to account for the licensee's grant back to the licensor of rights in improvements which the licensee makes to the intangible asset licensed. Here again, the licensor's minimum value 385 would be reduced by the competitive advantage gain to the licensor from the grant back license and the licensee's maximum value 395 would be reduced by the licensee's loss of competitive advantage due to the grant back license.

Although the methodology seeks to minimize the amount of information necessary to value an intellectual property license, it does require information on each competing product. If this information is not available, or too costly to obtain, the methodology can be based on a hypothetical average competing product. When based on a hypothetical average product, the competitive advantage changes can be calculated in terms of the hypothetical average product to approximate the licensor and licensee values.

Figure 11:
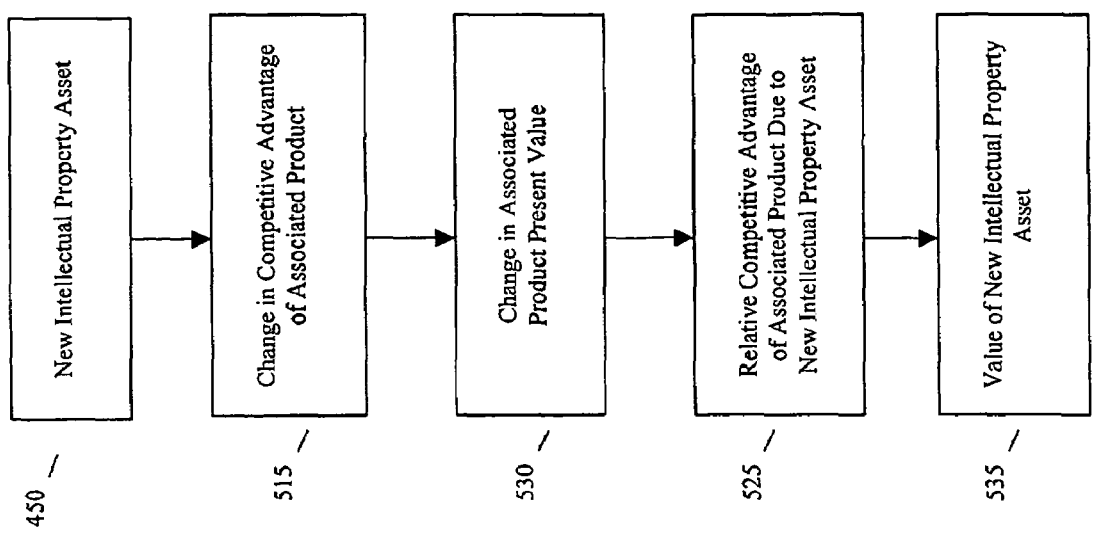
FIG. 11 is a high level flow chart of a fourth embodiment of the present invention.
Figure 12:
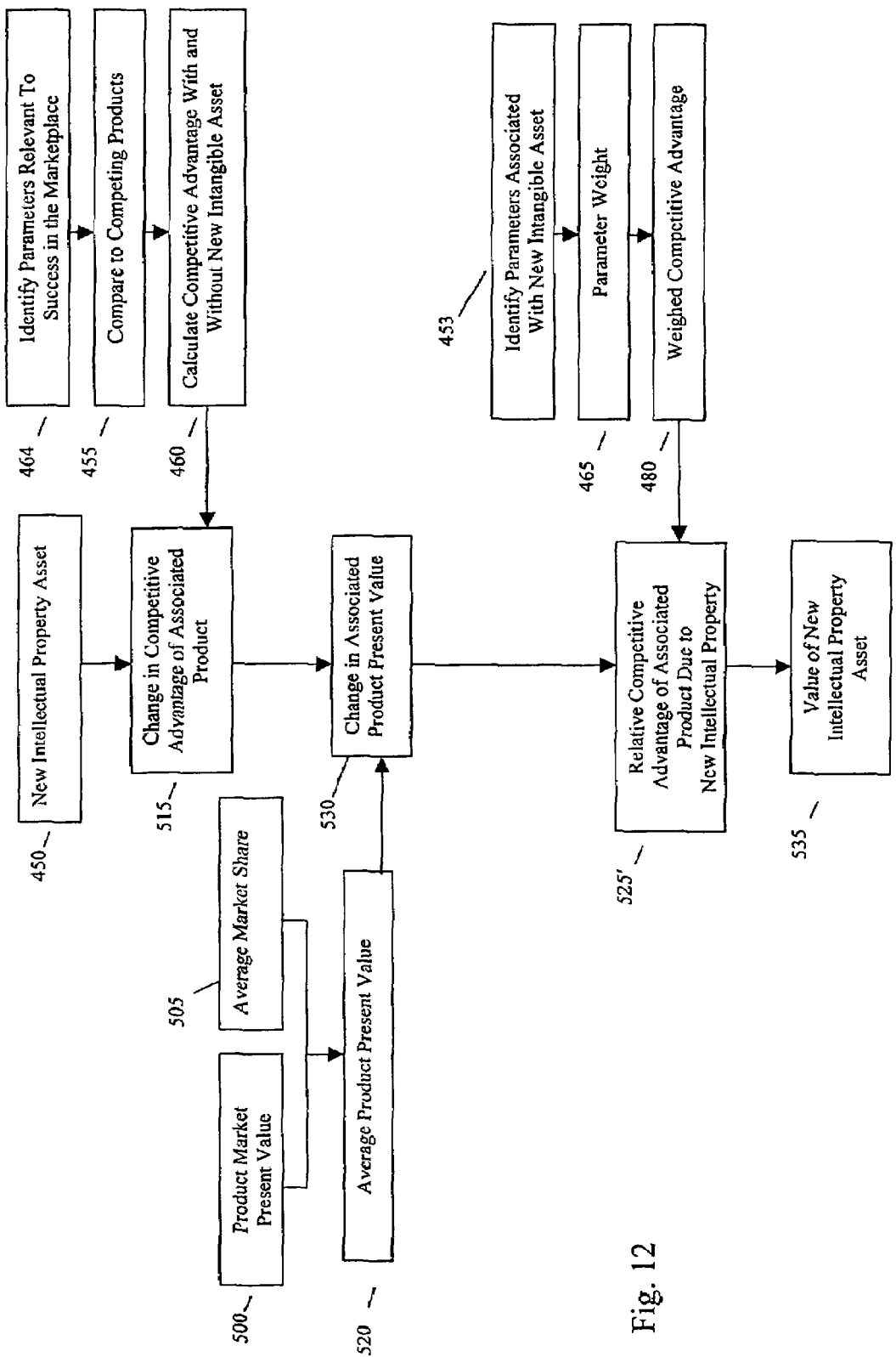
FIG. 12 is an intermediate level flow chart of a fourth embodiment of the present invention.

FIG. 11 illustrates the basic modules required to reach the value 535 of a new intellectual property asset 450. These modules involve a calculation of (1) the change in competitive advantage of an associated product 515, (2) the resultant change in disaggregated present value of the associated product 530 (disaggregated for the type of intellectual property asset being developed), and (3) the relative competitive advantage 525' or the percent contribution of the new intellectual property asset to the change in disaggregated present value 500. FIG. 12 further details the components of the modules and shows that the change in competitive advantage of an associated product 515 is determined after identifying parameters relevant to success in the marketplace 464, comparing those parameters to competing products 455, and calculating the competitive advantage with and without the new intellectual property asset 460. The change in associated product present value 530 is calculated as in the previous embodiments from the product market disaggregated present value 500 and average market share 505. The relative competitive advantage of the associated product due to the new intellectual property asset 525' is also calculated as previously by determining the weighted competitive advantage 480 from the parameter weight 465 after identifying the parameters associated with the new intellectual property asset 453.

Figure 10:
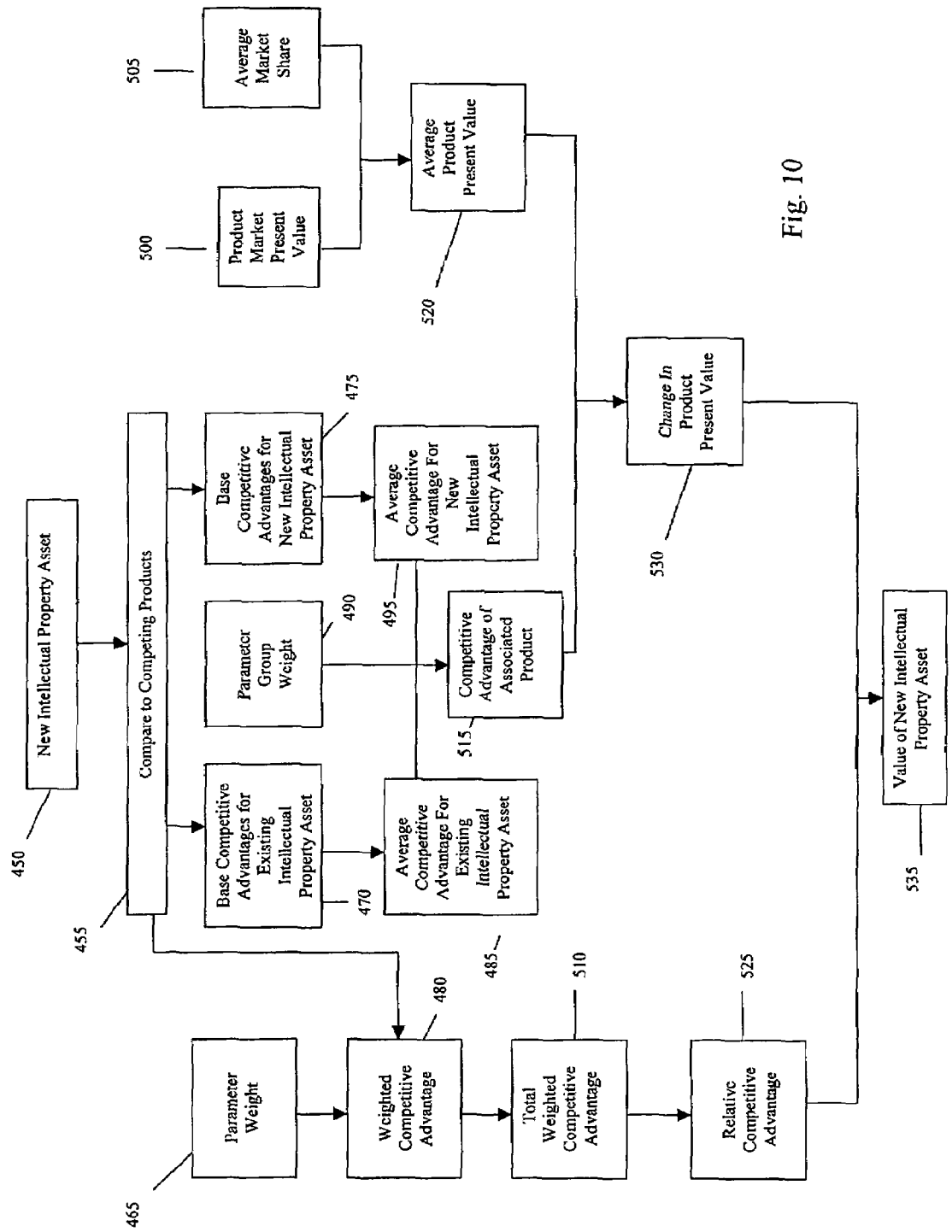
FIG. 10 is a detailed flow chart of a fourth embodiment of the present invention.

FIG. 10 demonstrates in detail how the methodology may be used to value 535 a new intellectual property asset 450. This embodiment of the methodology is based on the change in competitive advantage (CAΔ) 515 due to the difference between the average competitive advantage (ACA) of a product with an existing intellectual property asset (EIPA) and the average competitive advantage of a product with the new intellectual property asset (NIPA). To determine the average competitive advantage of the existing intellectual property asset, it is necessary to first calculate an average value (AvV) for substitute intellectual property assets (SIPA). This is accomplished in the same manner as the embodiments described above by using a spreadsheet to compare parameters of the existing intellectual property asset against competing assets in the marketplace 455. The comparison should include the product with existing intellectual property and with the new intellectual property asset. From these comparisons, the average values for competing assets can be determined as explained previously.

Next, the existing intellectual property asset base competitive advantage (EIPA:BCA) 470 is calculated from the substitute intellectual property asset average value (SIPA:AvV) and the existing intellectual property asset actual values (EIPA:AcV) for each relevant parameter as determined in the comparison 455. The formula is as follows:

EIPA:BCA=(EIPA:AcV−SIPA:AvV)/SIPA:AvV

From these calculations, the existing intellectual property asset average competitive advantage (EIPA:AVA) 485 can be determined by totaling the existing intellectual property asset base competitive advantages 470 for each parameter and dividing by the number of parameters (NP'). The formula is as follows:

EIPA:ACA=(EIPA.$_1$:BCA+EIPA$_2$:BCA+EIPA$_2$: BCA+ ... EIPA$_n$:BCA)/NP'

The calculation of the new intellectual property asset average competitive advantage (NPA:AVA) 495 begins with a determination of the base competitive advantage 475 for all of the parameters through the comparison 460 to competing products. This is accomplished by comparing the competing average value for each parameter, as done previously for the existing intellectual property asset, with the target values (TV) for each corresponding parameter that the new intellectual property asset is expected to achieve. The formula for calculating the base competitive advantage 475 is:

NIPA:BCA=(NIPA:TV−SIPA:AvV)/SIPA:AvV

The average competitive advantage of the new intellectual property asset 495 is the sum of the base competitive advantages 475 of all of the parameters divided by the number of parameters, as follows:

NIPA:ACA=(NIPA$_1$:BCA+NIPA$_2$:BCA+NIPA$_3$: BCA+ ... NIPA$_n$:BCA)/NP'

Before calculating the change in competitive advantage 515 due to the new intellectual property asset 450, the parameter group weight 490 must be determined. The parameter group weight 490 is calculated as a ratio between the firm's R&D$, AD$ and BI$, just as in the previous embodiments of the methodology. The formulas for the technical, reputational, and operational parameter group weights are, respectively:

TP'G:W=R&D$/(R&D$+AD$+BI$)

RP'G:W=AD$/(R&D$+AD$+BI$)

OP'G:W=BI$/(R&D$+AD$+BI$)

The change in competitive advantage of the associated product 515 can now be calculated according to the following formula:

CAΔ=(NIPA:ACA−EIPA:ACA)×P'G:W

The competitive advantage change 515 can be used to determine the change in product present value 530 due to the new intellectual property asset. The calculation first requires a determination of the average product present value 520. The average product present value 520 is the present value of an average product in the market as calculated from the product market present value (PM:PV) 500 and the average market share (AvMS) 505. The product market present value can be calculated, as in the second embodiment illustrated by FIG. 4, from information about the market obtained from outside sources. As in FIG. 4, the information that is needed is current annual gross sales (PM:GS) 220 in the market in dollars; the market growth (PM:MG) 275 as a percent each year; the product estimated life cycle (P:LC) 280; the product profit margin as a percentage of sales (P:PM) 285; and the appropriate present value discount (PVD) 290. The formula for calculating the product market's present value 295 is:

PM:PV$_{1...PM:LC}$=PM:GS×(1+PM:MG$_{1...PM:LC}$)× PM:PM$_{1...PM:LC}$×PVD$_{1...PM:LC}$

PM:PV=PM:PV$_1$+PM:PV$_2$+PM:PV$_3$+ ... PM: PV$_{PM:LC}$

The product market's present value is calculated for each year of life cycle and the results are summed to determine the total product market present value 500.

The average market share 505 is a percentage calculated from the number of substitute products (NSP) in the product market. The formula is AvMS=100/(NSP+1). From the average market share 505 and the product market present value 500, the average product present value 520 can be calculate by the formula AvP:PV=PM:PV×AvMS. The change in product present value (P:PVA) 530 attributable to the new intellectual property asset 450 can now be calculated by multiplying the change in competitive advantage 515 and the average product present value 520, or P:PVA=CAΔ×AvP:PV.

Before calculating the value of the new intellectual property asset 535, the relative competitive advantage 525 must be also be determined. The calculation of the new intellectual property asset's relative competitive advantage 525 begins with the calculation of the parameter weight (P':W) 465. The formula for calculating the parameter weight depends on whether the new intellectual property asset is associated with a prime parameter (PP') or a parameter set (P's) in the comparisons 455, 460. The formula if associated with a prime parameter is:

NIPA:P':W=0.50×(1−(M×NP')/100))

The formula if associated with a parameter set is:

NIPA:P':W=(0.50×(1+((M×NP')/100)))/(NP'−1)

Once the parameter weight 465 has been determined, the new intellectual property asset weighted competitive advantage (NIPA:WCA) 480 can be calculated from its base competitive advantage 460 as follows:

NIPA:WCA=NIPA:BCA×NIPA:P':W

This calculation is performed for each parameter and added together to constitute the total weighted competitive advantage (TWCA) 510 of the parameter group. Thus, P'G: TWCA=P'$_1$:WCA+P'$_2$:WCA+P'$_3$:WCA+ ... P+.$_n$:WCA. The formula for calculating the new intellectual property asset's relative comparative advantage (NIPA:RCA) 525 is as follows:

NIPA:RCA=NIPA:WCA/P'G:TWCA

The value of the new intellectual property asset (NIPA:V) can now be determined by multiplying the new intellectual property asset's relative comparative advantage 525 and the change in product present value 530. The formula is as follows:

NIPA:V=NIPA:RCA×P:PVΔ

The methodology values a new intellectual property asset based on its competitive advantage change 515, and the resulting product present value change 530, that is attributable to the new intellectual property asset. This value alone, however, does not determine whether the new intellectual property asset is a good investment of a firm's resources. To determine the relative worth of an investment in a new intellectual property asset, the value must be compared to the cost of investment and a rate of return calculated. The rate of return on an investment in any new intellectual property asset can be compared to the rate of return on alternative investments in other new intellectual property assets to determine which combination of investments produces the highest overall rate of return. The general formula for calculating the rate of return on an investment in a new intellectual property asset (NIPA) is:

Rate of Return=NIPA Value/Cost of Investment in NIPA

The description of the methodology is based on use by a single firm or entity. The method may also be used by two or more firms engaged in a research and development joint venture. The methodology can be used to value intellectual property assets created in a research and development joint venture, to divide these assets among joint venture partners according to their highest valued uses, and to calculate rates of return on investment to joint venture partners from newly created intellectual property assets.

What is claimed is:

1. A method of calculating the value of a license for an intellectual property asset between a licensor and a licensee using a data processing system, comprising the steps of:
    calculating a minimum value of said license to said licensor using said data processing system;
    calculating a maximum value of said license to a licensee using said data processing system;
    calculating a net value of said license by subtracting said minimum value from said maximum value using said data processing system;
    determining a licensor investment in said license based on said net value and said minimum value using said data processing system;
    determining a licensee investment in said license based on said net value and said maximum value using said data processing system; and
    calculating a lump-sum equal return payment which provides an equal percentage rate of return to said licensor and said licensee on said licensor investment and said licensee investment in said license using said data processing system; and
    displaying said lump-sum equal return payment using said data processing system.

2. The method of claim 1, further comprising the steps of:
    calculating a present value for profits in a product market for a product embodying the intellectual property asset using said data processing system;
    calculating a competitive advantage of said product embodying the intellectual property asset relative to an average substitute product in said product market using said data processing system;
    calculating an expected market share of said product embodying the intellectual property asset from said competitive advantage of said product embodying the intellectual property asset using said data processing system;
    determining a present value of said product embodying the intellectual property asset based on said calculated present value for said profits and said calculated expected market share using said data processing system; and
    displaying said present value of said product embodying the intellectual property asset using said data processing system.

3. The method of claim 2, wherein the step of calculating a minimum value of said license to said licensor comprises calculating a change in value of a first product of said licensor that embodies said intellectual property asset based on a change in competitive advantage of said first product.

4. The method of claim 3, wherein the step of calculating a maximum value of said license to a licensee comprises calculating a change in value of a second product of said licensee that embodies said intellectual property asset based on a change in competitive advantage of said second product.

5. The method of claim 4, wherein the step of determining the licensor investment in said license comprises calculating a sum of an expected lost market share of said licensor due to said license and a predetermined percentage of an amount of investment made by said licensor in said intellectual property asset.

6. The method of claim 5, wherein the step of determining a licensee investment in said license comprises calculating a sum of research and development costs to be borne by said licensee, a cost of new equipment and training required to implement said license, and an equal return payment paid by the licensee to the licensor.

7. The method of claim 6, wherein said calculated present value of the market profits is disaggregated based on a type of said intellectual property asset addressed by said license.

8. The method of claim 7, wherein said lump-sum equal return payment is discounted to adjust for intellectual property risks, technical risks, and market risks according to predetermined percentages.

9. The method of claim 1, wherein said minimum value of said license to said licensor and said maximum value of said license to said licensee are adjusted according to whether said license is exclusive or non-exclusive.

10. A user based, interactive computer system having at least one programmable processor for calculating a value of a license for an intellectual property asset between a licensor and a licensee based on an input of information pertaining to a product embodying said intellectual property asset, said system comprising:
    means for calculating a present value of market profits in a product market for said product embodying the intellectual property asset;
    means for calculating a competitive advantage of the product embodying said intellectual property asset relative to an average substitute product in said product market;
    means for calculating an expected market share of said product embodying the intellectual property asset from said competitive advantage of the product embodying intellectual property asset; and
    means for determining a present value of said product embodying the intellectual property asset based on said calculated present value of the market profits and said calculated expected market share of said product;
    means for calculating a minimum value of said license to said licensor;
    means for calculating a maximum value of said license to a licensee;
    means for calculating a net value of said license by subtracting said minimum value from said maximum value;
    means for determining a licensor investment in said license based on a sum of an expected lost market share of said licensor due to said license and a predetermined percentage of investment made by said licensor in said intellectual property asset;
    means for determining a licensee investment in said license based on a sum of research and development costs to be borne by said licensee, a cost of new equipment and training required to implement said license, and an equal return payment paid by the licensee to the licensor;

means for calculating an equal return payment which provides an equal percentage rate of return to said licensor and said licensee based on said net value, said licensor investment, and said licensee investment; and means for displaying said equal return payment.

11. The method of claim 10, wherein said equal return payment is discounted to adjust for intellectual property risks, technical risks, and market risks according to predetermined percentages.

12. The method of claim 11, wherein said minimum value of said license to said licensor and said maximum value of said license to said licensee are adjusted according to whether said license is non-exclusive.

13. The method of claim 8, wherein said lump-sum equal return payment is recalculated to adjust for the amount of the risk premium assumed by said licensor and said licensee.

14. The method of claim 9, wherein the recalculated equal return payment is converted into a series of royalty payments over a term of said license.

15. The method of claim 14, wherein the series of royalty payments over a term of said license are converted into royalty rate percentages on said licensor said product sales.

* * * * *